(12) United States Patent
Zhu

(10) Patent No.: US 11,696,276 B2
(45) Date of Patent: *Jul. 4, 2023

(54) DATA SCHEDULING METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,450

(22) Filed: Sep. 13, 2021

(65) Prior Publication Data

US 2021/0410157 A1 Dec. 30, 2021

Related U.S. Application Data

(63) Continuation of application No. 16/621,669, filed as application No. PCT/CN2017/088776 on Jun. 16, 2017, now Pat. No. 11,147,083.

(51) Int. Cl.
*H04J 3/00* (2006.01)
*H04W 72/12* (2023.01)
*H04W 76/27* (2018.01)
*H04W 4/02* (2018.01)
*H04W 28/02* (2009.01)
*H04W 72/0446* (2023.01)

(52) U.S. Cl.
CPC ........... *H04W 72/12* (2013.01); *H04W 4/023* (2013.01); *H04W 28/0252* (2013.01); *H04W 72/0446* (2013.01); *H04W 76/27* (2018.02)

(58) Field of Classification Search
CPC . H04W 72/12; H04W 72/0446; H04W 76/27; H04W 28/0253; H04W 4/023
See application file for complete search history.

(56) References Cited

U.S. PATENT DOCUMENTS 9,317,283 B2 4/2016 Gonion
11,147,083 B2 * 10/2021 Zhu ................... H04W 72/1289
(Continued)

FOREIGN PATENT DOCUMENTS

CN 105099634 A 11/2015
CN 105722240 A 6/2016
(Continued)

OTHER PUBLICATIONS

Notification to grant patent right for invention of Chinese application No. 201780000470.X dated Nov. 24, 2021.
(Continued)

*Primary Examiner* — Erika A Washington
(74) *Attorney, Agent, or Firm* — Syncoda LLC; Feng Ma

(57) ABSTRACT

A data scheduling method includes: transmitting to a terminal a determination rule for determining target location information corresponding to each of a plurality of target time domain units, the plurality of target time domain units being a plurality of time domain units for performing data bearing according to scheduling signaling. As such, in the dynamic scheduling of a terminal by a base station, an objective of simultaneously scheduling a plurality of target time domain units through one scheduling signaling to perform data bearing can be realized.

20 Claims, 15 Drawing Sheets

(56) References Cited

U.S. PATENT DOCUMENTS

| | | |
|---|---|---|
| 2005/0206566 A1 | 9/2005 | Stilp et al. |
| 2008/0170531 A1 | 7/2008 | Petry et al. |
| 2014/0369292 A1 | 12/2014 | Wu et al. |
| 2015/0003375 A1 | 1/2015 | Liu et al. |
| 2015/0349998 A1 | 12/2015 | Atungsiri et al. |
| 2016/0182207 A1 | 6/2016 | Chung et al. |
| 2016/0353238 A1* | 12/2016 | Gherardi ............... H04W 84/18 |
| 2017/0135105 A1 | 5/2017 | Li et al. |

FOREIGN PATENT DOCUMENTS

| | | |
|---|---|---|
| CN | 105992376 A | 10/2016 |
| CN | 106162556 A | 11/2016 |
| CN | 106470093 A | 3/2017 |
| CN | 106559807 A | 4/2017 |
| CN | 106656440 A | 5/2017 |
| CN | 106712914 A | 5/2017 |
| CN | 106797530 A | 5/2017 |
| WO | 2013078968 A1 | 6/2013 |
| WO | 2016015318 A1 | 2/2016 |
| WO | 2016184365 A1 | 11/2016 |

OTHER PUBLICATIONS

SMG Reference: RE/SMG-030408QR7, European Telecommunication Standard; Digital cellular telecommunications system (Phase 2+); Mobile radio interface layer 3 specification (GSM 04.08 version 5.11.0 Release 1996); 3GPP tsg_geran\TSG_GERAN, Nov. 1998, entire document.

3rd Generation Partnership Project, Mobile radio interface layer 3 specification Radio Resource Control Protocol 3GPP TS 04.18 V8.10.0, Jun. 2001, entire document.

First office action of Chinese application No. 201780000470.X dated Jul. 2, 2021.

International search report of PCT application No. PCT/CN2017/088776 dated Mar. 6, 2018.

Non-Final Rejection of U.S. Appl. No. 16/621,669 dated Mar. 3, 2021.

Notice of Allowance of U.S. Appl. No. 16/621,669 dated Jun. 16, 2021.

* cited by examiner

 Downlink control domain
 Downlink data domain
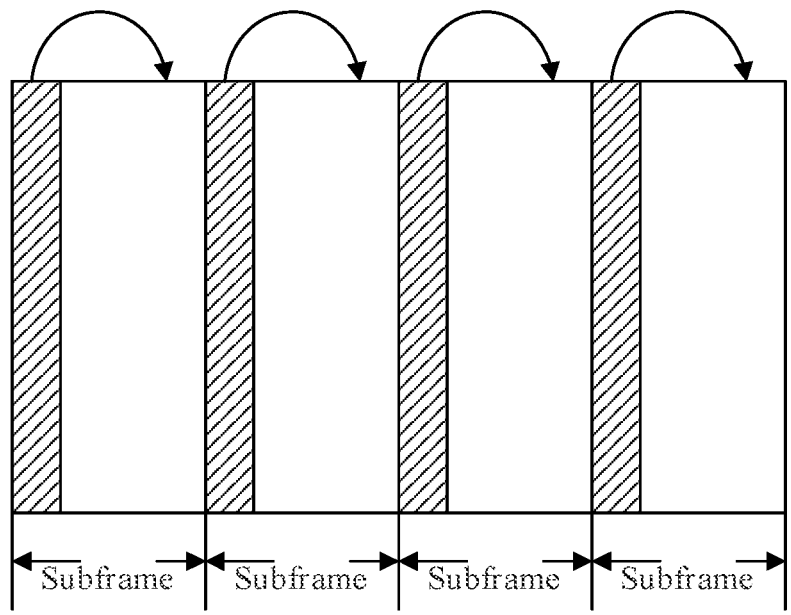
FIG. 1
FIG. 2

DATA SCHEDULING METHOD AND APPARATUS

CROSS-REFERENCE TO RELATED APPLICATIONS

This is a continuation of U.S. patent application Ser. No. 16/621,669 filed on Dec. 11, 2019, which is a national stage of International Application No. PCT/CN2017/088776 filed on Jun. 16, 2017. The disclosures of these applications are hereby incorporated by reference in their entirety.

BACKGROUND

In a system of LTE (Long Term Evolution), uplink and downlink data transmission of a terminal is based on scheduling of a base station. The base station instructs the terminal to perform data bearing in a predefined manner on a corresponding resource location by transmitting uplink scheduling signaling or downlink scheduling signaling.

SUMMARY

The present disclosure relates generally to the field of communications technologies, and more specifically to a data scheduling method and apparatus.

Various embodiments of the present disclosure provide a data scheduling method and apparatus.

According to a first aspect of the present disclosure, there is provided a data scheduling method applied to a base station, the method including:

transmitting to a terminal a rule for determining target location information corresponding to each of a plurality of target time domain units, the plurality of target time domain units being a plurality of time domain units for performing data bearing according to scheduling signaling.

Optionally, the transmitting to a terminal a rule for determining target location information corresponding to each of a plurality of target time domain units includes:

transmitting through target signaling to a terminal a rule for determining target location information corresponding to each of a plurality of target time domain units;

wherein the target signaling is configuration signaling for configuring the rule of the target location information or the scheduling signaling.

Optionally, when the plurality of target time domain units are continuous in a time domain, the rule of the target location information includes: relative location information of a first target time domain unit of the plurality of target time domain units with respect to a reference time domain unit; and the rule of the target location information further includes:

a transmission length value of the plurality of target time domain units; or relative location information of a last target time domain unit of the plurality of target time domain units with respect to the reference time domain unit.

Optionally, the rule of the target location information includes:

relative location information of each of the plurality of target time domain units with respect to the reference time domain unit.

Optionally, the method further includes:

transmitting to the terminal a target transmission mode corresponding to each of the plurality of target time domain units, wherein the target transmission mode is a transmission mode for performing data bearing on the plurality of target time domain units according to the scheduling signaling.

According to a second aspect of the present disclosure, there is provided a data scheduling method applied to a terminal, the method including:

receiving a rule transmitted by a base station for determining target location information corresponding to each of a plurality of target time domain units;

when receiving uplink scheduling signaling transmitted by the base station, transmitting uplink data to the base station on the plurality of target time domain units indicated by the rule of the target location information; and when receiving downlink scheduling signaling transmitted by the base station, receiving downlink data transmitted by the base station to the terminal on the plurality of target time domain units indicated by the rule of the target location information.

Optionally, when the plurality of target time domain units are continuous in a time domain, the rule of the target location information includes: relative location information of a first target time domain unit of the plurality of target time domain units with respect to a reference time domain unit; and the rule of the target location information further includes:

a transmission length value of the plurality of target time domain units; or relative location information of a last target time domain unit of the plurality of target time domain units with respect to the reference time domain unit.

Optionally, the rule of the target location information includes:

relative location information of each of the plurality of target time domain units with respect to the reference time domain unit.

Optionally, the method further includes:

receiving a target transmission mode corresponding to each of the plurality of target time domain units transmitted by the base station;

wherein the transmitting uplink data to the base station on the plurality of target time domain units indicated by the rule of the target location information includes:

transmitting uplink data to the base station by using the target transmission mode corresponding to each of the plurality of target time domain units respectively on the plurality of target time domain units indicated by the rule of the target location information; and the receiving downlink data transmitted by the base station to the terminal on the plurality of target time domain units indicated by the rule of the target location information includes:

receiving downlink data transmitted by the base station to the terminal by using the target transmission mode corresponding to each of the plurality of target time domain units respectively on the plurality of target time domain units indicated by the rule of the target location information.

According to a third aspect of the present disclosure, there is provided a data scheduling method applied to a base station, the method including:

transmitting trigger signaling to a terminal, the trigger signaling being used to trigger data bearing on a plurality of target time domain units.

Optionally, the trigger signaling includes one of:

radio resource control signaling, system information, media access control address control unit, and physical layer signaling.

According to a fourth aspect of the present disclosure, there is provided a data scheduling method applied to a terminal, the method including:

if trigger signaling transmitted by a base station is received, determining, according to a predefined rule for determining a plurality of pieces of target location information and a location of scheduling signaling, a plurality of target time domain units indicated by the plurality of pieces of target location information;

when the scheduling signaling is uplink scheduling signaling, transmitting uplink data to the base station on the plurality of target time domain units; and when the scheduling signaling is downlink scheduling signaling, receiving downlink data transmitted by the base station to the terminal on the plurality of target time domain units.

Optionally, the trigger signaling includes one of:

radio resource control signaling, system information, media access control address control unit, and physical layer signaling.

Optionally, the target location information is relative location information of the target time domain unit with respect to the scheduling signaling, and determining, according to a predefined rule for determining a plurality of pieces of target location information and a location of scheduling signaling, a plurality of target time domain units indicated by the plurality of pieces of target location information includes:

searching for, according to relative location information of the plurality of target time domain units with respect to the scheduling signaling respectively predefined in a communication protocol and the location of the scheduling signaling, a plurality of target time domain units indicated by the plurality of pieces of target location information.

Optionally, after receiving the trigger signaling transmitted by the base station, the method further includes:

searching for a target transmission mode corresponding to each of the plurality of target time domain units for performing data bearing predefined in a communication protocol;

transmitting uplink data to the base station on the plurality of target time domain units includes:

transmitting uplink data to the base station by using the target transmission mode corresponding to each of the plurality of target time domain units respectively on the plurality of target time domain units; and receiving downlink data transmitted by the base station to the terminal on the plurality of target time domain units includes:

receiving downlink data transmitted by the base station to the terminal on the plurality of target time domain units by using the target transmission mode corresponding to each of the plurality of target time domain units, respectively.

According to a fifth aspect of the present disclosure, there is provided a data scheduling apparatus applied to a base station, the apparatus including:

a first transmission module configured to transmit to a terminal a rule for determining target location information corresponding to each of a plurality of target time domain units, the plurality of target time domain units being a plurality of time domain units for performing data bearing according to scheduling signaling.

Optionally, the first transmission module includes:

a transmission submodule configured to transmit through target signaling to a terminal a rule for determining target location information corresponding to each of plurality of target time domain units;

wherein the target signaling is configuration signaling for configuring the rule of the target location information or the scheduling signaling.

Optionally, when the plurality of target time domain units are continuous in a time domain, the rule of the target location information at least includes: relative location information of a first target time domain unit of the plurality of target time domain units with respect to a reference time domain unit; and the rule of the target location information further includes:

a transmission length value of the plurality of target time domain units; or relative location information of a last target time domain unit of the plurality of target time domain units with respect to the reference time domain unit.

Optionally, the rule of the target location information includes:

relative location information of each of the plurality of target time domain units with respect to the reference time domain unit.

Optionally, the apparatus further includes:

a second transmission module configured to transmit to the terminal a target transmission mode corresponding to each of the plurality of target time domain units, wherein the target transmission mode is a transmission mode for performing data bearing on the plurality of target time domain units according to the scheduling signaling.

According to a sixth aspect of the present disclosure, there is provided a data scheduling apparatus applied to a terminal, the apparatus including:

a first receiving module configured to receive a rule transmitted by a base station for determining target location information corresponding to each of a plurality of target time domain units;

a first data bearing module configured to, when receiving uplink scheduling signaling transmitted by the base station, transmit uplink data to the base station on the plurality of target time domain units indicated by the rule of the target location information; and a second data bearing module configured to, when receiving downlink scheduling signaling transmitted by the base station, receive downlink data transmitted by the base station to the terminal on the plurality of target time domain units indicated by the rule of the target location information.

Optionally, when the plurality of target time domain units are continuous in a time domain, the rule of the target location information at least includes: relative location information of a first target time domain unit of the plurality of target time domain units with respect to a reference time domain unit; and the rule of the target location information further includes:

a transmission length value of the plurality of target time domain units; or relative location information of a last target time domain unit of the plurality of target time domain units with respect to the reference time domain unit.

Optionally, the rule of the target location information includes:

relative location information of each of the plurality of target time domain units with respect to the reference time domain unit.

Optionally, the apparatus further includes:

a second receiving module configured to receive a target transmission mode corresponding to each of the plurality of target time domain units transmitted by the base station;

wherein the first data bearing module includes:

a first data bearing submodule configured to transmit uplink data to the base station by using the target transmission mode corresponding to each of the plurality of target time domain units respectively on the plurality of target time domain units indicated by the rule of the target location information; and the second data bearing module includes:

a second data bearing submodule configured to receive downlink data transmitted by the base station to the terminal by using the target transmission mode corresponding to each of the plurality of target time domain units respectively on the plurality of target domain units indicated by the rule of the target location information.

According to a seventh aspect of the present disclosure, there is provided a data scheduling apparatus applied to a base station, the apparatus including:

a third transmission module configured to transmit trigger signaling to a terminal, the trigger signaling being used to trigger data bearing on a plurality of target time domain units.

Optionally, the trigger signaling includes one of:

radio resource control signaling, system information, media access control address control unit, and physical layer signaling.

According to an eighth aspect of the present disclosure, there is provided a data scheduling apparatus applied to a terminal, the apparatus including:

a determination module configured to, if trigger signaling transmitted by a base station is received, according to a predefined rule for determining a plurality of pieces of target location information and a location of scheduling signaling, determine a plurality of target time domain units indicated by the plurality of pieces of target location information;

a third data bearing module configured to, when the scheduling signaling is uplink scheduling signaling, transmit uplink data to the base station on the plurality of target time domain units; and a fourth data bearing module configured to, when the scheduling signaling is downlink scheduling signaling, receive downlink data transmitted by the base station to the terminal on the plurality of target time domain units.

Optionally, the trigger signaling includes one of:

radio resource control signaling, system information, media access control address control unit, and physical layer signaling.

Optionally, the target location information is relative location information of the target time domain unit with respect to the scheduling signaling, and the determination module includes:

a search submodule configured to search for a plurality of target time domain units indicated by the plurality of pieces of target location information according to relative location information of the plurality of target time domain units with respect to the scheduling signaling respectively predefined in a communication protocol and the location of the scheduling signaling.

Optionally, the apparatus further includes:

a search module configured to search for a target transmission mode corresponding to each of the plurality of target time domain units for performing data bearing predefined in a communication protocol;

the third data bearing module includes:

a third data bearing submodule configured to transmit uplink data to the base station by using the target transmission mode corresponding to each of the plurality of target time domain units respectively on the plurality of target time domain units; and the fourth data bearing module includes:

a fourth data bearing submodule configured to receive downlink data transmitted by the base station to the terminal by using the target transmission mode corresponding to each of the plurality of target time domain units respectively on the plurality of target time domain units.

According to a ninth aspect of the present disclosure, there is provided a computer readable storage medium storing a computer program for performing the data scheduling method according to the first aspect.

According to a tenth aspect of the present disclosure, there is provided a computer readable storage medium storing a computer program for performing the data scheduling method according to the second aspect According to an eleventh aspect of the present disclosure, there is provided a computer readable storage medium storing a computer program for performing the data scheduling method according to the third aspect.

According to a twelfth aspect of the present disclosure, there is provided a computer readable storage medium storing a computer program for performing the data scheduling method according to the fourth aspect.

According to a thirteenth aspect of the present disclosure, there is provided a data scheduling apparatus applied to a base station, the apparatus including:

a processor;

a memory for storing processor executable instructions;

wherein the processor is configured to:

transmit to a terminal a rule for determining target location information corresponding to each of a plurality of target time domain units, the plurality of target time domain units being a plurality of time domain units for performing data bearing according to scheduling signaling.

According to a fourteenth aspect of the present disclosure, there is provided a data scheduling apparatus applied to a terminal, the apparatus including:

a processor;

a memory for storing processor executable instructions;

wherein the processor is configured to:

receive a rule transmitted by a base station for determining target location information corresponding to each of a plurality of target time domain units;

when receiving uplink scheduling signaling transmitted by the base station, transmit uplink data to the base station on the plurality of target time domain units indicated by the rule of the target location information; and when receiving downlink scheduling signaling transmitted by the base station, receive downlink data transmitted by the base station to the terminal on the plurality of target time domain units indicated by the rule of the target location information.

According to a fifteenth aspect of the present disclosure, there is provided a data scheduling apparatus applied to a base station, the apparatus including:

a processor;

a memory for storing processor executable instructions;

wherein the processor is configured to:

transmit trigger signaling to a terminal, the trigger signaling being used to trigger data bearing on the plurality of target time domain units.

According to a sixteenth aspect of the present disclosure, there is provided a data scheduling apparatus applied to a terminal, the apparatus including:

a processor;

a memory for storing processor executable instructions;

wherein the processor is configured to:

if trigger signaling transmitted by a base station is received, according to a predefined rule for determining a plurality of pieces of target location information and a location of scheduling signaling, determine a plurality of target time domain units indicated by the plurality of pieces of target location information;

when the scheduling signaling is uplink scheduling signaling, transmit uplink data to the base station on the plurality of target time domain units; and when the scheduling signaling is downlink scheduling signaling, receive downlink data transmitted by the base station to the terminal on the plurality of target time domain units.

The technical solutions provided by the embodiments of the present disclosure may include the following beneficial effects:

In an embodiment of the present disclosure, a base station may transmit to a terminal a rule for determining target location information corresponding to each of a plurality of target time domain units so as to perform data bearing on the plurality of target time domain units according to scheduling signaling. Hosted. Through the above process, in the dynamic scheduling of the terminal by the base station, the purpose of simultaneously scheduling a plurality of target time domain units through one scheduling signaling to perform data bearing is realized.

In the embodiment of the disclosure, optionally, the target signaling may be configuration signaling or scheduling signaling. The configuration signaling may include at least one of the following: radio resource control signaling, system information, media access control address control unit, and physical layer signaling, which is easy to implement and has high availability.

In an embodiment of the present disclosure, the plurality of target time domain units is scheduled by the scheduling signaling simultaneously. Optionally, if the plurality of target time domain units is continuous in the time domain, the rule of the target location information may at least include: relative location information of a first target time domain unit of the plurality of target time domain units with respect to a reference time domain unit; and the rule of the target location information further includes: a transmission length value of the plurality of target time domain units; or relative location information of the last target time domain unit of the plurality of target time domain units with respect to the reference time domain unit. Alternatively, regardless whether the plurality of target time domain units is continuous in the time domain, the rule of the target location information may include: relative location information of each of the plurality of target time domain units with respect to the reference time domain unit. Through the foregoing process, the base station may transmit the rule of the target location information of each of the plurality of time domain units to the terminal, so as to realize the purpose of simultaneously scheduling a plurality of target time domain units through one scheduling signaling to perform data bearing in the dynamic scheduling of the terminal by the base station.

In an embodiment of the present disclosure, the base station may transmit the target transmission mode corresponding to each of the plurality of target time domain units to the terminal in addition to the rule of the target location information, in order to adopt a corresponding transmission mode to perform data bearing on the plurality of target time domain units according to the scheduling signaling. The purpose of dynamically scheduling the data bearing of the terminal by the base station is further achieved.

In an embodiment of the present disclosure, after receiving the rule for determining the target location information corresponding to each of the plurality of target time domain units, the terminal may transmit uplink data to the base station on the plurality of target time domain units indicated by the rule of the target location information if receiving uplink scheduling signaling transmitted by the base station; and the terminal receives downlink data transmitted by the base station to the terminal on the plurality of target time domain units indicated by the rule of the target location information if receiving downlink scheduling signaling transmitted by the base station. Through the above process, in the dynamic scheduling of the terminal by the base station, the purpose of simultaneously scheduling a plurality of target time domain units through one scheduling signaling to perform data bearing is realized.

In an embodiment of the present disclosure, optionally, the base station may transmit the trigger signaling to the terminal without transmitting the rule of the target location information to the terminal, and further trigger data bearing on the plurality of target time domain units according to the scheduling signaling. Through the foregoing process, the occupation of the interaction resources between the base station and the terminal can be reduced, and the purpose of simultaneously scheduling a plurality of target time domain units through one scheduling signaling to perform data bearing in dynamic scheduling is also achieved.

In an embodiment of the present disclosure, after receiving the trigger signaling transmitted by the base station, the terminal determines a plurality of target time domain units indicated by a plurality of pieces of target location information according to a predefined rule for determining the plurality of pieces of target location information and a location of scheduling signaling, so that when the scheduling signaling is uplink scheduling signaling, the terminal transmits uplink data to the base station on the plurality of target time domain units; and when the scheduling signaling is downlink scheduling signaling, the terminal receives downlink data transmitted by the base station to the terminal on the plurality of target time domain units. Through the above process, while reducing the occupation of the interaction resources between the base station and the terminal, in the dynamic scheduling, the purpose of simultaneously scheduling a plurality of target time domain units through one scheduling signaling to perform data bearing is realized.

It is to be understood that both the foregoing general description and the following detailed description are exemplary and explanatory only and are intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a schematic diagram of a data scheduling scenario according to some embodiments.

FIG. 2 is a flowchart of a data scheduling method according to some embodiments.

DETAILED DESCRIPTION

Figure 3:
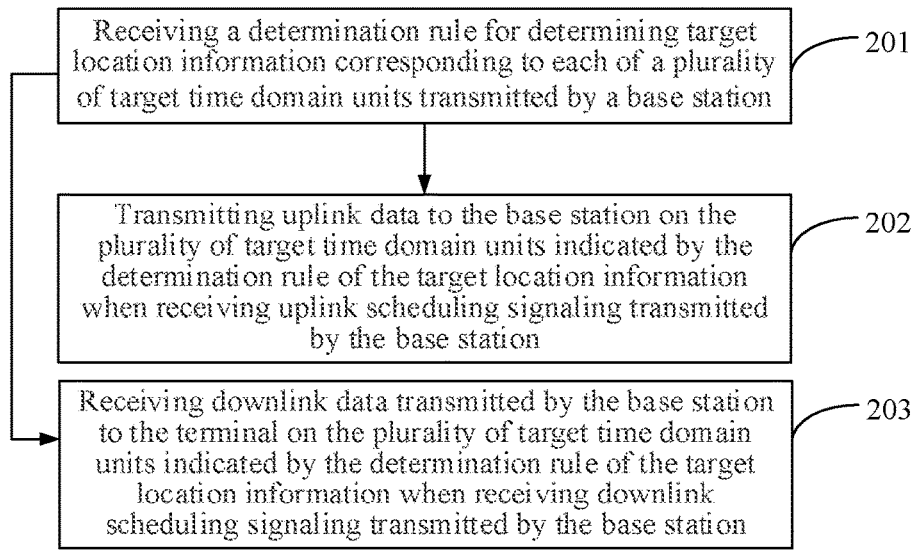
FIG. 3 is a flowchart of another data scheduling method according to some embodiments.

Reference will now be made in detail to exemplary embodiments, examples of which are illustrated in the accompanying drawings. The following description refers to the accompanying drawings in which the same numbers different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

The terminology used in the present disclosure is for the purpose of describing particular embodiments, and is not intended to limit the disclosure. The singular forms of "a," "an" and "the" used in the present disclosure and the appended claims are also intended to include plural forms unless the context clearly indicates other meanings. It should also be understood that the term "and/or" as used herein refers to and encompasses any and all possible combinations of one or more of the associated listed items.

It should be understood that although the terms first, second, third, etc. may be used to describe various information in this disclosure, such information should not be limited to these terms. These terms are only used to distinguish the same type of information from each other. For example, the first information may also be referred to as second information without departing from the scope of the present disclosure. Similarly, the second information may also be referred to as first information. Depending on the context, the word "if" as used herein may be interpreted as "when" or "in response to determining."

For dynamic scheduling in an LTE system, one scheduling signaling can only instruct the data bearing on a time domain unit.

In a 5G system, for a service with a relatively large amount of traffic, such as an eMBB (Enhance Mobile Broadband) service, the dynamic scheduling method cannot satisfy the service requirements.

In an example, a dynamic scheduling process of data transmission by a base station to a terminal is as shown in FIG. 1 in which one scheduling signaling can schedule data hearing of one time domain unit. For example, when the scheduling signaling is downlink scheduling signaling, the terminal may schedule one time domain unit to receive data according to the signaling. The time domain unit may be in units of OFDM (Orthogonal Frequency Division multiplexing) symbols, slots, subframes, or radio frames.

In an embodiment of the present disclosure, in order to better adapt to a service with a relatively large amount of traffic, a method of scheduling a plurality of target time domain units by one scheduling signaling to perform data bearing in a dynamic scheduling process of data transmission by the base station to the terminal.

An embodiment of the present disclosure provides a data scheduling method applied to a base station, which includes the following steps.

In step 101, a rule is transmitted to a terminal for determining target location information corresponding to each of a plurality of target time domain units. The plurality of target time domain units is a plurality of time domain units for performing data bearing according to scheduling signaling.

In the foregoing embodiment, the base station may transmit to the terminal the rule for determining target location information corresponding to each of a plurality of target time domain units so as to perform data bearing on the plurality of target time domain units according to the scheduling signaling. Through the above process, in the dynamic scheduling of the terminal by the base station, the purpose of simultaneously scheduling a plurality of target time domain units through one scheduling signaling to perform data bearing is realized.

During implementation, when the base station configures a target terminal to perform scheduling across a transmission unit or a plurality of transmission units, the base station transmits to the terminal the rule for determining target location information corresponding to each of the plurality of target time domain units.

For the foregoing step 101, optionally, the base station may transmit the rule of the target location information to the terminal using target signaling. The target signaling may be configuration signaling for configuring the rule of the target location information, and may be RRC (Radio Resource Control) signaling, system message, MAC CE (MAC Control Element) or physical layer signaling.

In an actual application, the base station may first transmit configuration signaling to the terminal. After receiving the scheduling signaling, the terminal determines a plurality of target time domain units according to the rule for determining the target location information in the scheduling signaling. Then the terminal may transmit uplink data to the base station on the plurality of target time domain units indicated by the rule of the target location information when receiving uplink scheduling signaling transmitted by the base station; and receive downlink data transmitted by the base station to the terminal on the plurality of target time domain units indicated by the rule of the target location information when receiving downlink scheduling transmitted by the base station.

Optionally, in order to save signaling resources, the base station may also directly transmit the rule of the target location information to the terminal using the transmitted scheduling information.

In an embodiment of the present disclosure, the plurality of target time domain units may be continuous or discontinuous in a time domain.

When the plurality of target time domain units is continuous in the time domain, the rule of the target location information may include: relative location information of a first target time domain unit of the plurality of target time domain units with respect to a reference time domain. Optionally, the time domain unit where the scheduling signaling is located may be used as the reference time domain unit; or location information of the reference time domain unit is indicated by the scheduling signaling. A starting location of the plurality of target time domain units which is continuous in the time domain may be represented by the relative location information of the first target time domain unit with respect to the reference time domain unit. For example, the relative location information of the first target time domain unit with respect to the time domain unit where the scheduling signaling is located is 2 and adopts a unit of OFDM symbol, then the starting location of the plurality of target time domain units is the second OFDM symbol after the scheduling signaling.

Further optionally, the rule of the target location information may further include: a transmission length value of the plurality of target time domain units. At this time, the terminal may determine the plurality of target time domain units for performing data bearing according to the determined starting location and the transmission length value of the plurality of target time domain units.

Alternatively, the rule of the target location information may include relative location information of the last target time domain unit of the plurality of target time domain units with respect to the reference time domain unit in addition to the relative location information of the first target time domain unit of the plurality of target time domain units with respect to the reference time domain unit. That is, an ending location of the plurality of target time domain units which is continuous in the time domain is represented by the relative location information of the last target time domain unit with respect to the time domain unit where the scheduling signaling is located. Since the plurality of target time domain units is continuous, the terminal can also determine the plurality of target time domain units for data bearing according to the foregoing starting location and ending location.

Of course, regardless whether the plurality of target time domain units is continuous in the time domain, the rule of the target location information may include: relative location information of each of the plurality of target time domain units with respect to the reference time domain unit. That is, the base station may transmit to the terminal relative location information of each target time domain unit with respect to the time domain unit where the scheduling signaling is located, and the terminal determines each target time domain unit for performing data bearing according to the rule of the target location information.

In an embodiment, optionally, referring to FIG. 2, FIG. 2 is a flowchart of a data scheduling method according to the foregoing embodiment. The data scheduling method may further include the following step.

In step 102, a target transmission mode corresponding to each of the plurality of target time domain units is transmitted to the terminal. The target transmission mode is a transmission mode for performing data bearing on the plurality of target time domain units according to the scheduling signaling.

In an embodiment of the present disclosure, the base station may further transmit a target transmission mode corresponding to each of the plurality of target time domain units to the terminal. Optionally, the base station also transmits the target transmission mode using target signaling. The target transmission mode may include, but is not limited to, modulation and coding mode, frequency domain resource location, power information, and beam information.

In this step, the base station transmits the target transmission mode to the terminal, so that when receiving uplink scheduling signaling transmitted by, the base station, the terminal transmits uplink data to the base station on the plurality of target domain units indicated by the rule of the target location information; and when receiving downlink scheduling signaling transmitted by the base station, the terminal receives downlink data transmitted by the base station to the terminal on the plurality of target time domain units indicated by the rule of the target location information, which further realizes the purpose of dynamically scheduling the data bearing of the terminal by the base station.

An embodiment of the present disclosure further provides a data scheduling method applied to a terminal. Referring to FIG. 3, FIG. 3 is a flowchart of a data scheduling method according to some embodiments, which may include the following steps.

In step 201, a rule for determining target location information corresponding to each of a plurality of target time domain units transmitted by a base station is received.

In step 202, when receiving uplink scheduling signaling transmitted by the base station, uplink data is transmitted to the base station on the plurality of target time domain units indicated by the rule of the target location information.

In step 203, when receiving downlink scheduling signaling transmitted by the base station, downlink data transmitted by the base station to the terminal on the plurality of target time domain units indicated by the rule of the target location information is received.

In the foregoing embodiment, after receiving the rule for determining the target location information corresponding to each of the plurality of target time domain units, when receiving uplink scheduling signaling transmitted by the base station, the terminal may transmit uplink data to the base station on the plurality of target time domain units indicated by the rule of the target location information; and when receiving downlink scheduling signaling transmitted by the base station, the terminal may receive downlink data transmitted to the terminal by the base station on the plurality of target time domain units indicated by the rule of the target location information. Through the above process, in the dynamic scheduling of the terminal by the base station, the purpose of simultaneously scheduling a plurality of target time domain units through one scheduling signaling to perform data bearing is realized.

For the above step 201, the plurality of target time domain units may be continuous or discontinuous in a time domain.

When the plurality of target time domain units is continuous in the time domain, the rule of the target location information may at least include: relative location information of a first target time domain unit of the plurality of target time domain units with respect to a reference time domain unit; the rule of the target location information further includes: a transmission length value of the plurality of target time domain units; or relative location information of the last target time domain unit of the plurality of target time domain units with respect to the reference time domain unit. Optionally, the reference time domain unit may be a time domain unit where the scheduling signaling is located; or location information of the reference time domain unit may be indicated by the scheduling signaling.

Alternatively, regardless whether the plurality of target time domain units is continuous in the time domain, the rule of the target location information may include: relative location information of each of the plurality of target time domain units with respect to the reference time domain unit. The reference time domain unit may be a time domain unit where the scheduling signaling is located, or location information of the reference time domain unit may be indicated by the scheduling signaling.

In this step, the terminal directly receives the rule for determining the target location information transmitted by the base station according to the related art.

Figure 4A:
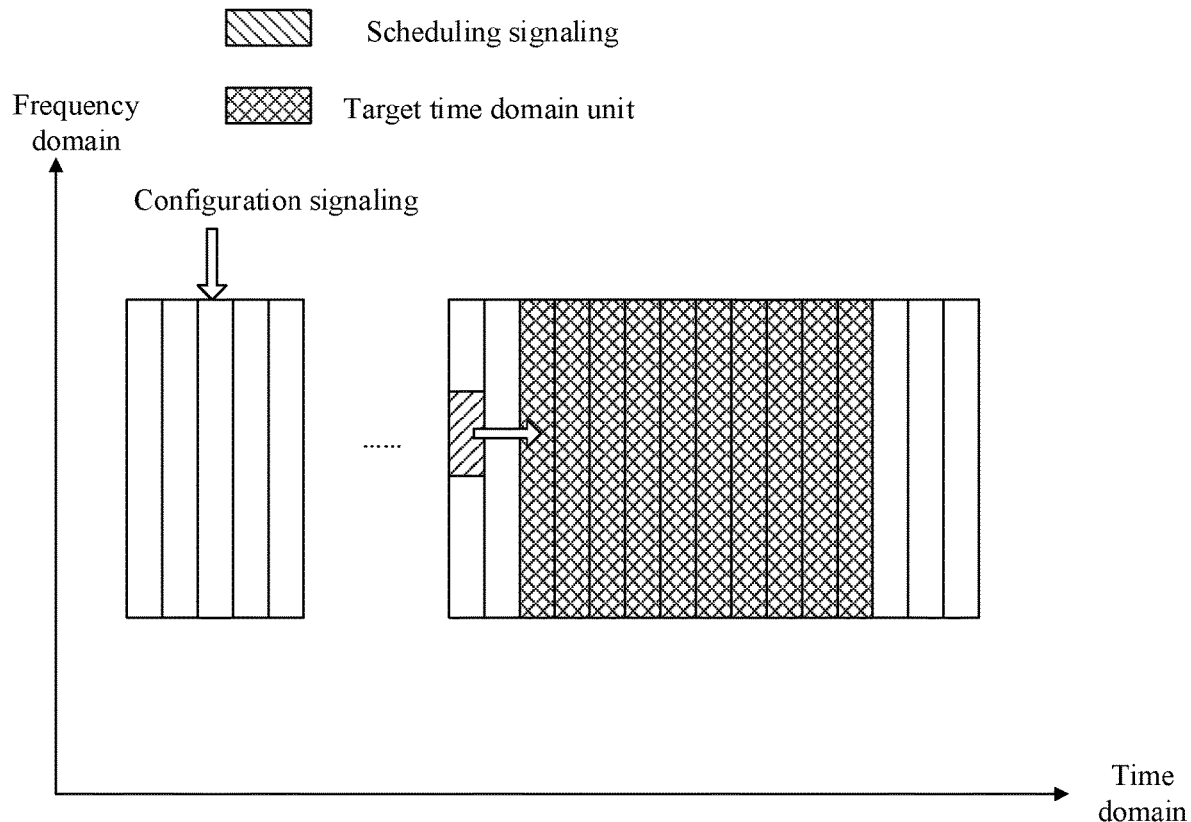
FIG. 4A is a first schematic diagram schematic diagrams showing a data scheduling scenario according to some embodiments.
Figure 4B:
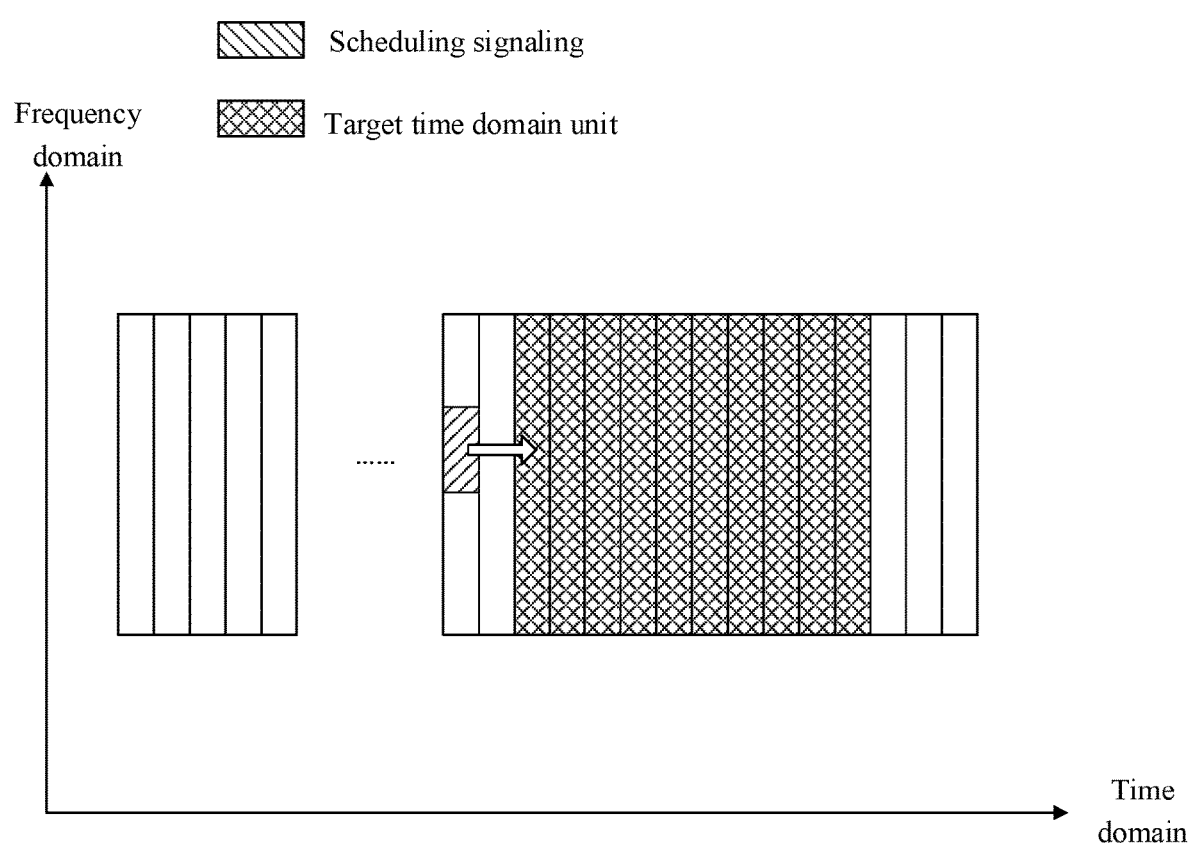
FIG. 4B is a second schematic diagram showing a data scheduling scenario according to some embodiments.

The terminal may determine the plurality of target time domain units indicated by the rule of the target location information after receiving the rule of the target location information. For example, as shown in FIG. 4A, the rule of the target location information is transmitted by the base station to the terminal using configuration signaling. The relative location information of the first target time domain unit with respect to the time domain unit where the scheduling signaling is located is 2 and adopts a unit of OFDM symbol and the transmission length value is 10, then the starting location of the plurality of target time domain units is the second OFDM symbol after the scheduling signaling, and a total of 10 OFDM symbols is target time domain units. In FIG. 4B, the plurality of target time domain units is also continuous, and the rule of the target location information is transmitted to the terminal by the base station through the scheduling signaling.

Figure 4C:
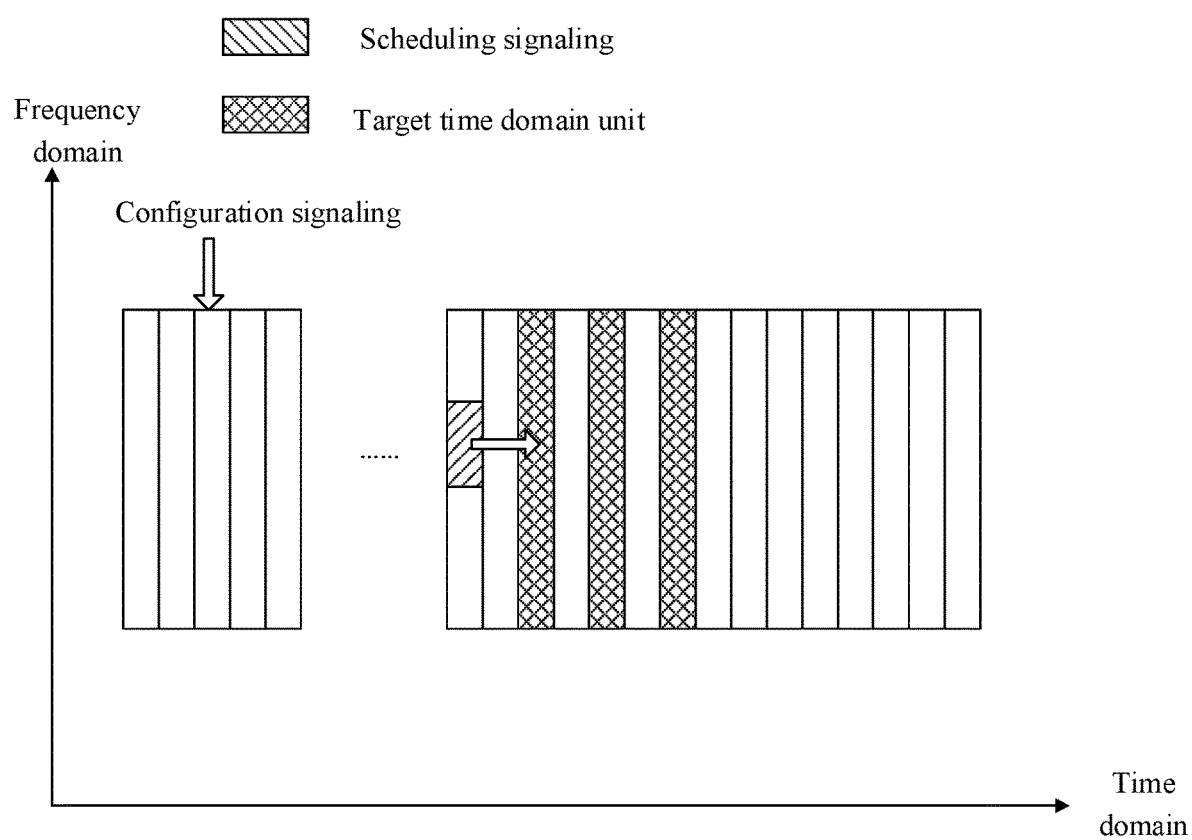
FIG. 4C is a third schematic diagram showing a data scheduling scenario according to some embodiments.
Figure 4D:
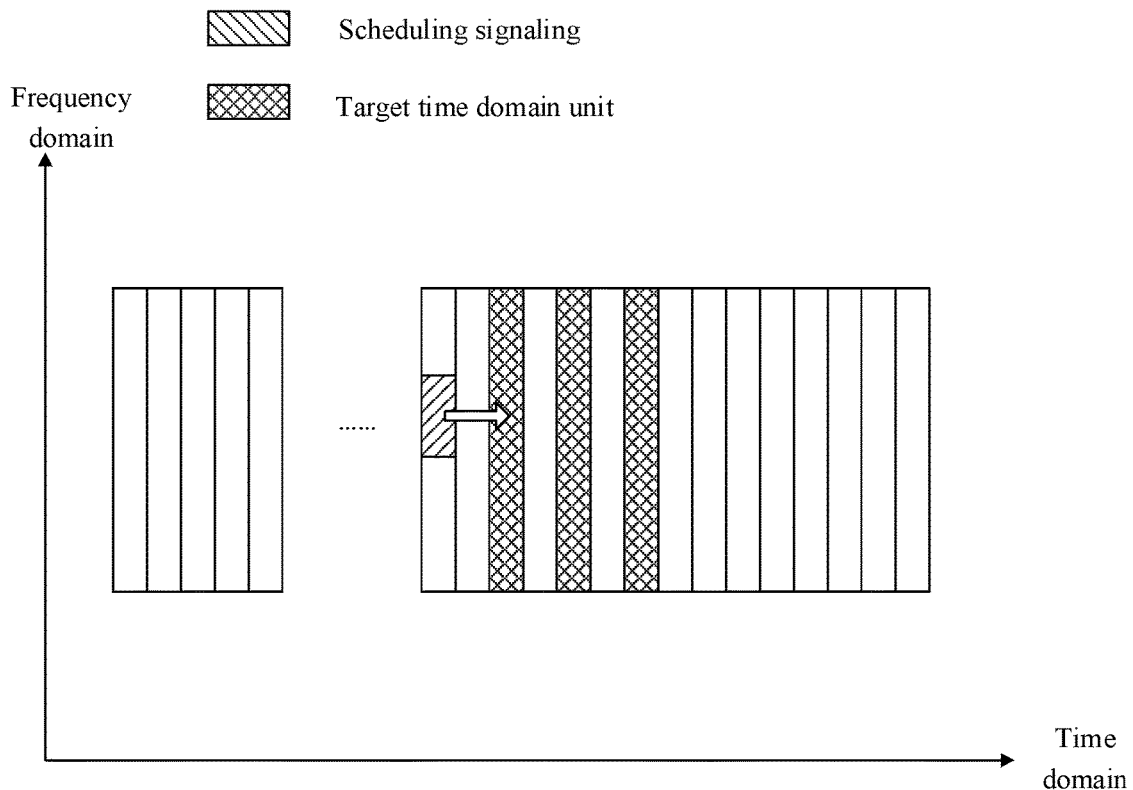
FIG. 4D is a fourth schematic diagram showing a data scheduling scenario according to some embodiments.

Alternatively, for example, as shown in FIG. 4C, the rule of the target location information is transmitted to the terminal by the base station through configuration signaling. The plurality of target time domain units is discontinuous. The plurality of target time domains indicated by the rule of the target location information is the 2nd OFDM symbol, the 4th OFDM symbol, and the 6th OFDM symbol after the scheduling signaling. In FIG. 4D, the plurality of target time domain units is also discontinuous, and the rule of the target location information is transmitted by the base station to the terminal through the scheduling signaling.

After the terminal determines the plurality of target time domain units according to the rule of the target location information, when uplink scheduling signaling transmitted by the base station is received, step 202 is performed to transmit uplink data to the base station according to a related art on the plurality of target time domain units indicated by the rule of the target location information.

After the terminal determines the plurality of target time domain units according to the rule of the target location information, when downlink scheduling signaling transmitted by the base station is received, step 203 is performed to receive downlink data transmitted to the terminal by the base station on the plurality of target time domain units indicated by the rule of the target location information.

That is, when the scheduling signaling is uplink scheduling signaling, the terminal transmits uplink data to the base station on the plurality of target time domain units; and when the scheduling signaling is downlink scheduling signaling, the terminal receives downlink data transmitted by the base station on the plurality of target time domain units.

The above process realizes the purpose of simultaneously scheduling a plurality of target time domain units through one scheduling signaling to perform data bearing.

Figure 5:
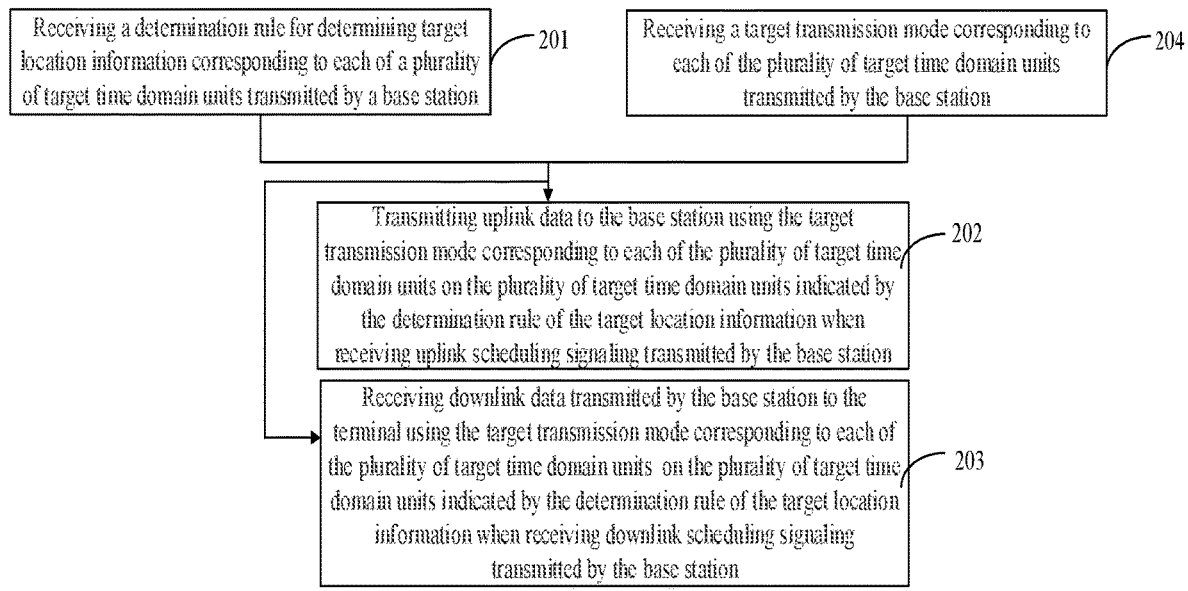
FIG. 5 is a flowchart of another data scheduling method according to some embodiments.

In an embodiment, the data scheduling method is shown in FIG. 5. FIG. 5 is a flowchart of another data scheduling method according to the embodiment shown in FIG. 3, which may further include the following step.

In step 204, a target transmission mode corresponding to each of the plurality of target time domain units transmitted by the base station is received.

In this step, the target transmission mode includes, but is not limited to, modulation and coding mode, frequency domain resource location, power information, and beam information. The base station transmits the target transmission mode to the terminal using configuration signaling or scheduling signaling. The terminal can receive the target transmission mode directly.

Accordingly, step 202 may include:

transmitting uplink data to the base station using the target transmission mode corresponding to each of the plurality of target time domain units on the plurality of target time domain units indicated by the rule of the target location information.

Step 203 may include:

receiving downlink data transmitted by the base station to the terminal using the target transmission mode corresponding to each of the plurality of target time domain units on the plurality of target time domain units indicated by the rule of the target location information.

Figure 6:
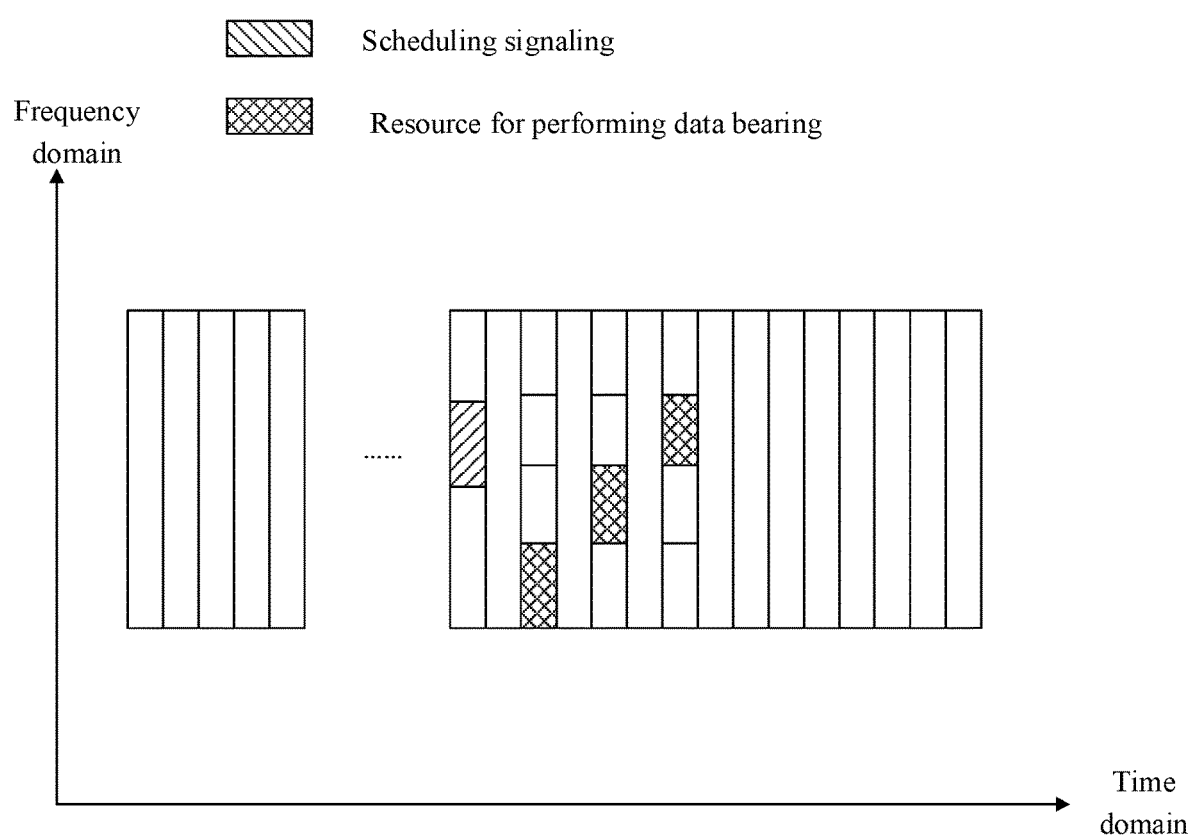
FIG. 6 is a schematic diagram of a data scheduling scenario according to some embodiments.

For example, the plurality of target time domain units indicated by the rule of the target location information transmitted by the base station to the terminal includes: the 2nd OFDM symbol, the 4th OFDM symbol, and the 6th OFDM after the time domain unit where the scheduling signaling is located. The target transmission mode uses different frequency domain resources, which corresponds to: the 1st frequency domain resource, the 2nd frequency domain resource, and the 3rd frequency domain resource, as shown in FIG. 6. Then the terminal can perform data bearing through the frequency domain resources of each target time domain unit.

Of course, the target transmission mode may also adopt different modulation and coding methods for data bearing, perform data bearing according to different powers, or may use different beams for data bearing and the like.

Figure 7:
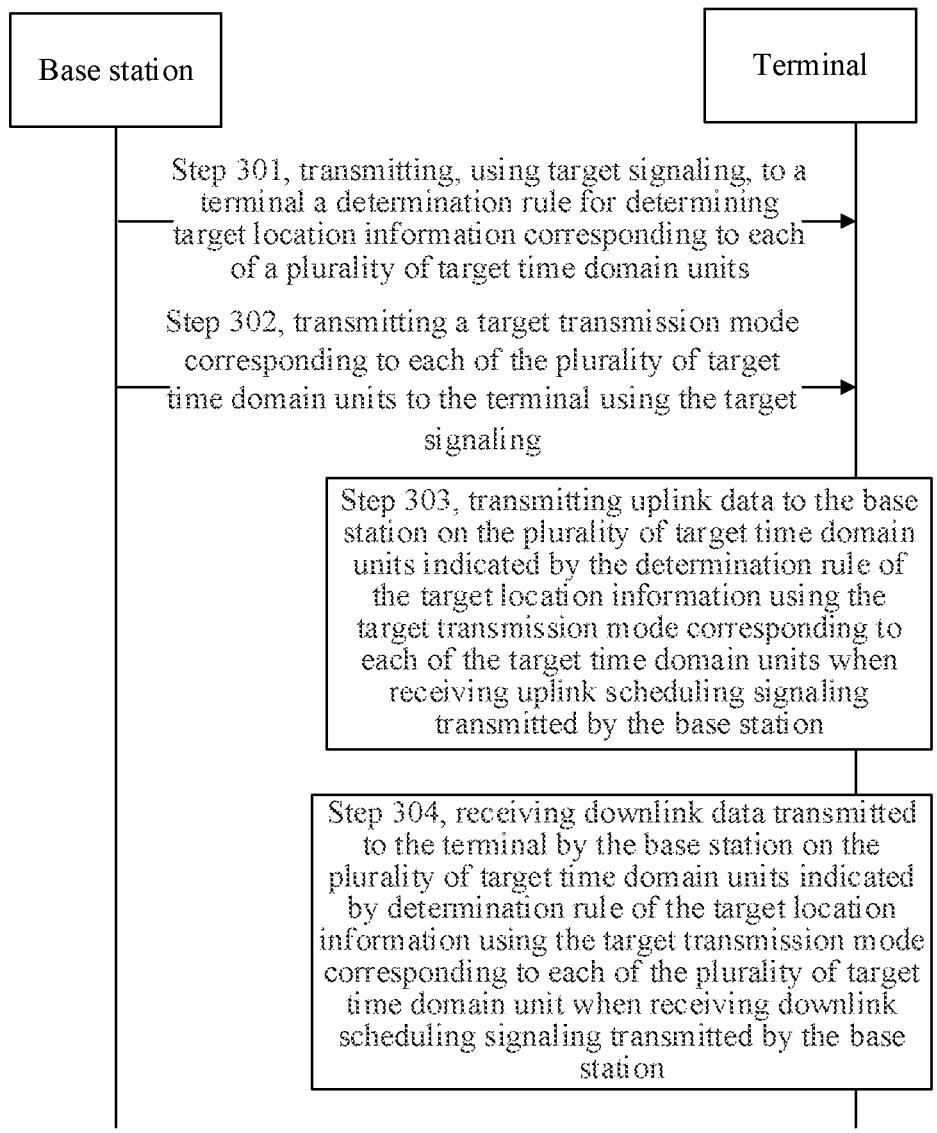
FIG. 7 is a flowchart of another data scheduling method according to some embodiments.

In an embodiment of the present disclosure, another data scheduling method is further provided. Referring to FIG. 7, the following steps may be included.

In step 301, the base station transmits, using target signaling, to a terminal a rule for determining target location information corresponding to each of a plurality of target time domain units.

The target signaling is configuration signaling for configuring the rule of the target location information or the scheduling signaling.

In step 302, the base station transmits a target transmission mode corresponding to each of the plurality of target time domain units to the terminal using the target signaling.

In step 303, when receiving uplink scheduling signaling transmitted by the base station, the terminal transmits uplink data to the base station on the plurality of target time domain units indicated by the rule of the target location information using the target transmission mode corresponding to each of the target time domain units.

In step 304, when receiving downlink scheduling signaling transmitted by the base station, the terminal receives downlink data transmitted to the terminal by the base station on the plurality of target time domain units indicated by rule of the target location information using the target transmission mode corresponding to each of the plurality of target time domain unit.

In the above embodiment, the base station may transmit the rule of the target location information to the terminal using target signaling, so that the terminal determines the plurality of target time domain units for performing data bearing. The purpose of simultaneously scheduling a plurality of target time domain units through one scheduling signaling to perform data bearing is realized in the dynamic scheduling of the terminal by the base station.

In an embodiment of the present disclosure, the base station may not transmit to the terminal the rule of the target location information, and the rule of the target location information has been predefined in the communication protocol.

In this implementation, an embodiment of the present disclosure provides a data scheduling method applied to a base station, which may include the following step.

In step 401, trigger signaling is transmitted to the terminal. The trigger signaling is used to trigger data bearing on a plurality of target time domain units.

In the foregoing embodiment, optionally, the base station may transmit the trigger signaling to the terminal instead of transmitting the rule of the target location information to the terminal to trigger data bearing on the plurality of target time domain units. Through the foregoing process, the occupation of the interaction resources between the base station and the terminal can be reduced, and the purpose of simultaneously scheduling a plurality of target time domain units through one scheduling signaling to perform data bearing is also realized.

During implementation, when the base station configures the target terminal to perform scheduling across a transmission unit or a plurality of transmission unit, the base station may transmit the trigger signaling to the terminal instead of transmitting the rule of the target location information to the terminal.

For the foregoing step 401, optionally, the trigger signaling may include at least one of the following: radio resource control signaling, system information, media access control address control unit, and physical layer signaling.

In this step, the base station may transmit the foregoing trigger signaling to the terminal according to related technologies. After receiving the trigger signaling, the terminal triggers a process of performing data bearing on the plurality of target time domain units.

Figure 8:
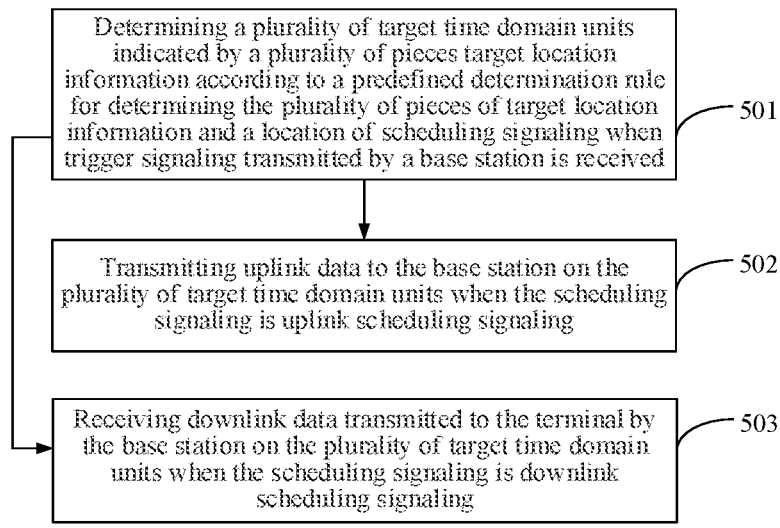
FIG. 8 is a flowchart of another data scheduling method according to some embodiments.

An embodiment of the present disclosure further provides another data scheduling method applied to a terminal. Referring to FIG. 8, FIG. 8 is a flowchart of a data scheduling method according to some embodiments, which may include the following steps.

In step 501, when trigger signaling transmitted by a base station is received, a plurality of target time domain units indicated by a plurality of pieces target location information is determined according to a predefined rule for determining the plurality of pieces of target location information and a location of scheduling signaling.

In step 502, when the scheduling signaling is uplink scheduling signaling, uplink data is transmitted to the base station on the plurality of target time domain units.

In step 503, when the scheduling signaling is downlink scheduling signaling, downlink data transmitted to the terminal by the base station on the plurality of target time domain units is received.

In the above embodiment, after receiving trigger signaling transmitted by the base station, the terminal determines a plurality of target time domain units according to a predefined rule of the target location information and a location of the scheduling signaling. Therefore, when the scheduling signaling is uplink scheduling signaling, uplink data is transmitted to the base station on the plurality of time domain units; and when the scheduling signaling is downlink scheduling signaling, downlink data transmitted to the terminal by the base station on the plurality of target time domain units is received. Through the above process, while reducing the occupation of the interaction resources between the base station and the terminal, the purpose of simultaneously scheduling a plurality of target time domain units through one scheduling signaling to perform data bearing is realized.

For the above step 501, the terminal may search for the rule of the target location information corresponding to each of the plurality of target time domain units for data bearing according to a predefined communication protocol.

In an embodiment of the present disclosure, the rule of the target location information may be predefined in the communication protocol, so that after receiving the trigger signaling transmitted by the base station, the terminal may automatically determine the rule of the corresponding target location information. Optionally, the target location information is relative location information of the target time domain unit with respect to the scheduling signaling.

Figure 9:
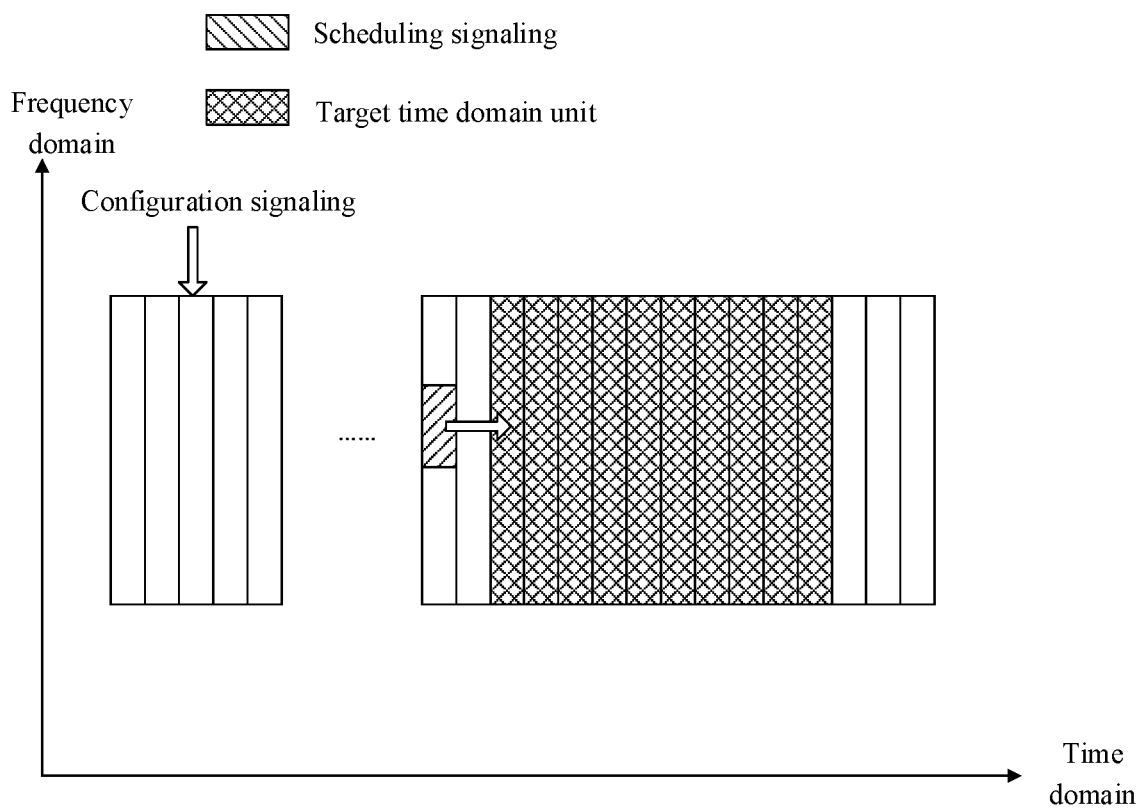
FIG. 9 is a schematic diagram of another data scheduling scenario according to some embodiments.

Of course, the plurality of target time domain units may be continuous or discontinuous in the time domain, and the rule of the corresponding target location information have been predefined in the communication protocol. Then, according to the relative location information and the location of the scheduling signaling, the plurality of target time domain units may be determined. For example, as shown in FIG. 9, the base station transmits trigger signaling to the terminal. In the communication protocol, the third OFDM symbol after the time domain unit where the scheduling signaling is located is predefined as the starting location of the plurality of target time domain units, and the transmission length value is 10. Alternatively, it is predefined in the communication protocol that every other OFDM symbol is used for data bearing from the third OFDM symbol after the time domain unit where the scheduling signaling is located, and the number of the plurality of target time domain units is a preset value. The terminal may determine the plurality of target time domain units in accordance with the provisions of the above communication protocol.

In the above step 502, after determining the rule of the target location information where the plurality of target time domain units is located, the terminal transmits uplink data to the base station on the plurality of target time domain units when the scheduling signaling is uplink scheduling signaling.

After step 503, after determining the rule of the target location information where the plurality of target time domain unit is located, the terminal receives downlink data transmitted to the terminal by the base station on the plurality of target time domain units when receiving downlink scheduling signaling transmitted by the base station.

Figure 10:
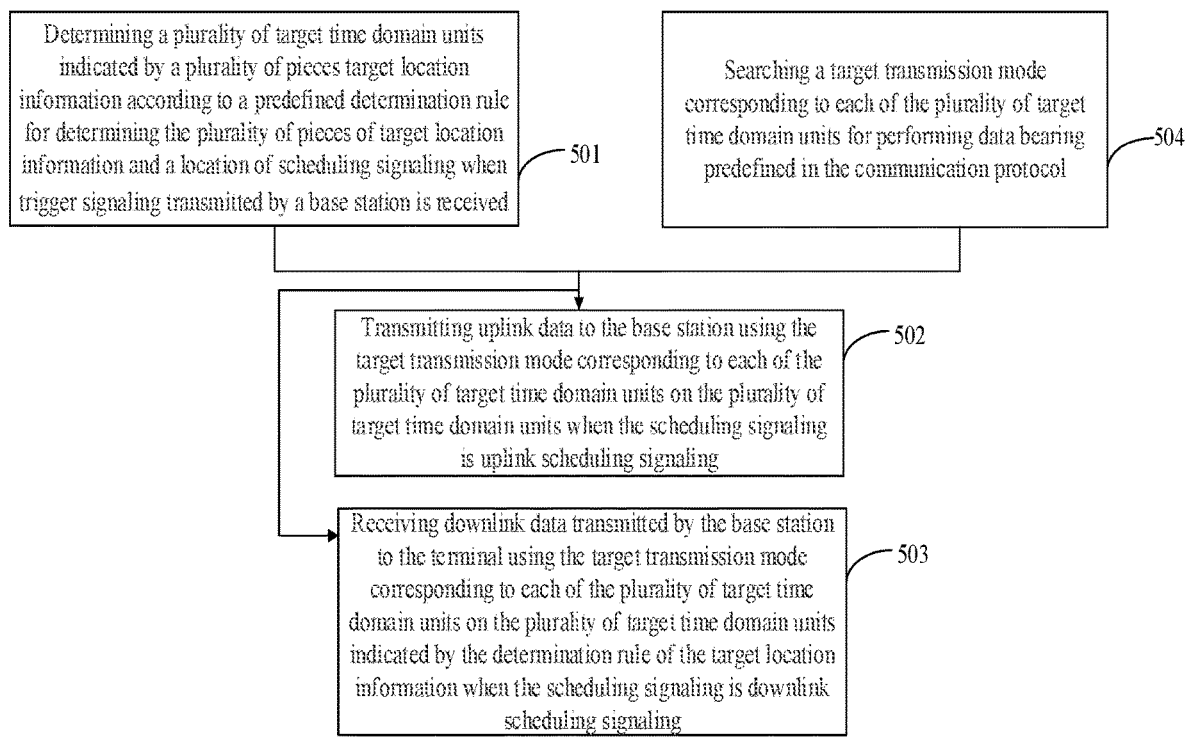
FIG. 10 is a flowchart of another data scheduling method according to some embodiments.

In an embodiment, the data scheduling method is shown in FIG. 10. FIG. 10 is a flowchart of another data scheduling method according to the embodiment shown in FIG. 8, which may further include the following step.

In step 504, a target transmission mode corresponding to each of the plurality of target time domain units for performing data bearing predefined in the communication protocol is searched.

In an embodiment of the present disclosure, the target transmission mode corresponding to each target time domain unit may also be predefined in the communication protocol. The target transmission mode includes, but is not limited to, the following modes: modulation and coding mode, frequency domain resource location, power information, and beam information.

Then, step 502 may include:

transmitting uplink data to the base station using the target transmission mode corresponding to each of the plurality of target time domain units on the plurality of target time domain units.

Step 503 may include:

receiving downlink data transmitted to the terminal by the base station on the plurality of target time domain units using the target transmission mode corresponding to each of the plurality of target time domain units.

In the foregoing embodiment, the purpose of dynamically scheduling the data bearing of the terminal by the base station is further realized.

Figure 11:
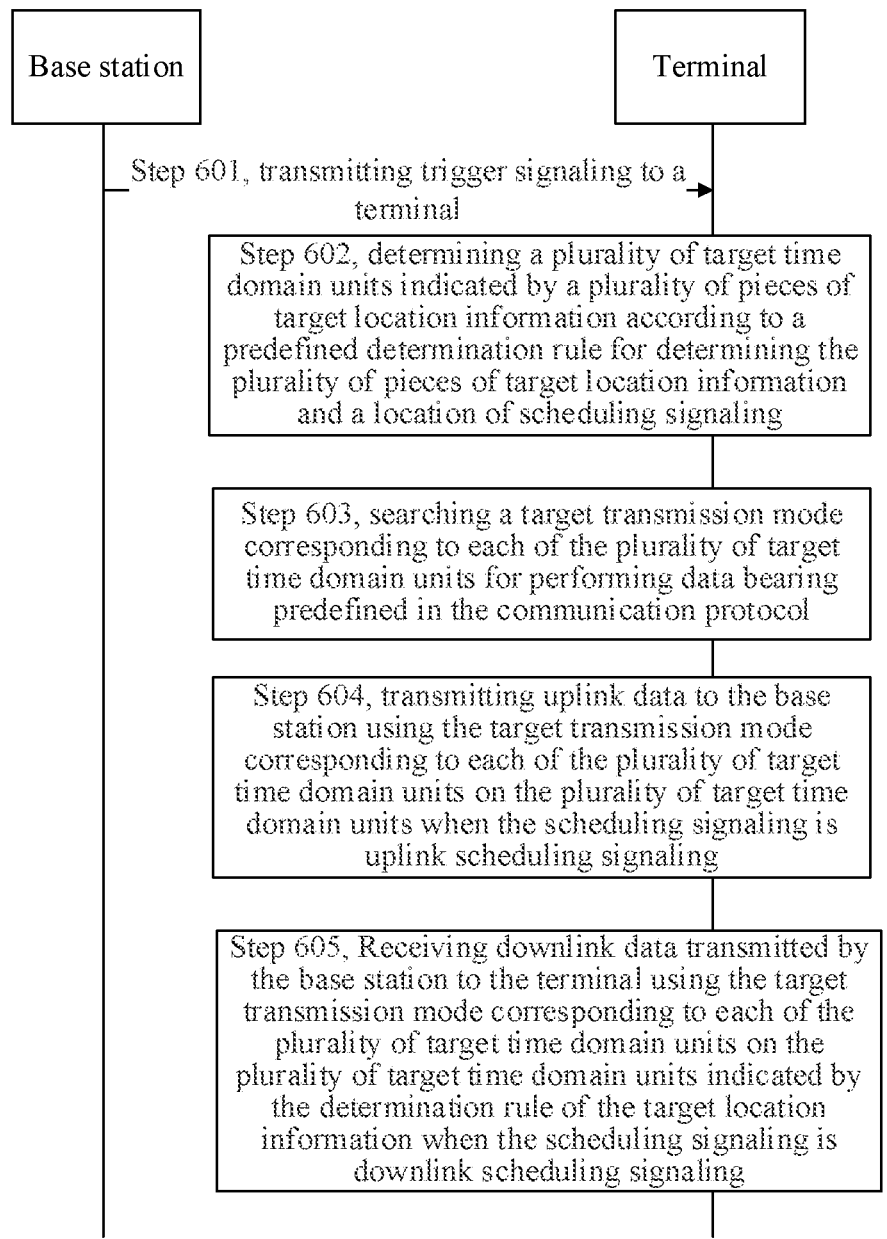
FIG. 11 is a flowchart of another data scheduling method according to some embodiments.

In an embodiment of the present disclosure, another data scheduling method is further provided. Referring to FIG. 11, the following steps may be included.

In step 601, a base station transmits trigger signaling to a terminal.

In step 602, the terminal determines a plurality of target time domain units indicated by a plurality of pieces of target location information according to a predefined rule for determining the plurality of pieces of target location information and a location of scheduling signaling.

In step 603, a target transmission mode corresponding to each of the plurality of target time domain units for performing data bearing predefined in the communication protocol is searched.

In step 604, when the scheduling signaling is uplink scheduling signaling, the terminal transmits uplink data to the base station using the target transmission mode corresponding to each of the plurality of target time domain units on the plurality of target time domain units.

In step 605, when the scheduling signaling is downlink scheduling signaling, downlink data transmitted to the terminal by the base station using the target transmission mode corresponding to each of the plurality of target time domain units on the plurality of target time domain units is received.

In the above embodiment, the base station may transmit the trigger signaling to the terminal, and the trigger signaling does not need to carry the rule of the target location information. After receiving the trigger signaling, the terminal determines a plurality of target time domain units indicated by a plurality of pieces of target location information and target transmission modes according to a predefined rule for determining the plurality of pieces of target location information and a location of scheduling signaling. Then, the base station or the terminal performs data bearing using a corresponding target transmission mode on the plurality of target time domain units. The purpose of simultaneously scheduling a plurality of target time domain units through one scheduling signaling to perform data bearing is realized in the dynamic scheduling of the terminal by the base station.

Corresponding to the foregoing application function implementation method embodiment, the present disclosure also provides an embodiment of an application function implementation apparatus and a corresponding terminal.

Figure 12:
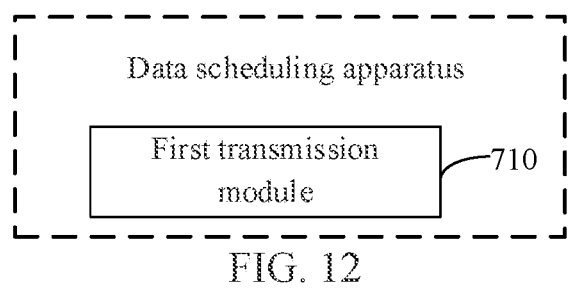
FIG. 12 is a block diagram of a data scheduling apparatus according to some embodiments.

Referring to FIG. 12, a block diagram of a data scheduling apparatus applied to a base station according to some embodiments is shown. The apparatus includes:

a first transmission module 710 configured to transmit to a terminal a rule for determining target location information corresponding to each of a plurality of target time domain units, the plurality of target time domain units being a plurality of time domain units for data bearing according to scheduling signaling.

Figure 13:
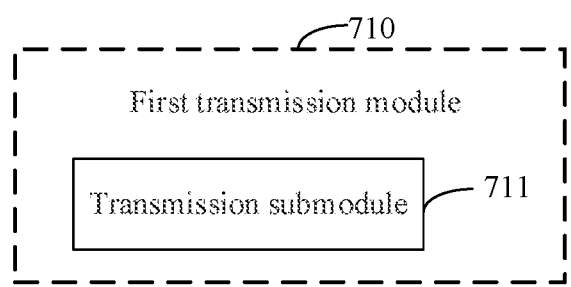
FIG. 13 is a block diagram of another data scheduling apparatus according to some embodiments.

Referring to FIG. 13, FIG. 13 is a block diagram of another data scheduling apparatus according to the embodiment shown in FIG. 12. The first transmission module 710 includes:

a transmission submodule 711 configured to transmit through target signaling to the terminal the rule for determining target location information corresponding to each of the plurality of target time domain units the target signaling is configuration signaling for configuring the rule of the target location information or the scheduling signaling.

Optionally, when the plurality of target time domain units is continuous in a time domain, the rule of the target location information at least includes: relative location information of a first target time domain unit of the plurality of target time domain units with respect to a reference time domain unit;

the rule of the target location information further includes:

a transmission length value of the plurality of target time domain units; or relative location information of the last target time domain unit of the plurality of target time domain units with respect to the reference time domain unit.

Optionally, the rule of the target location information includes:

relative location information of each of the plurality of target time domain units with respect to the reference time domain unit.

Figure 14:
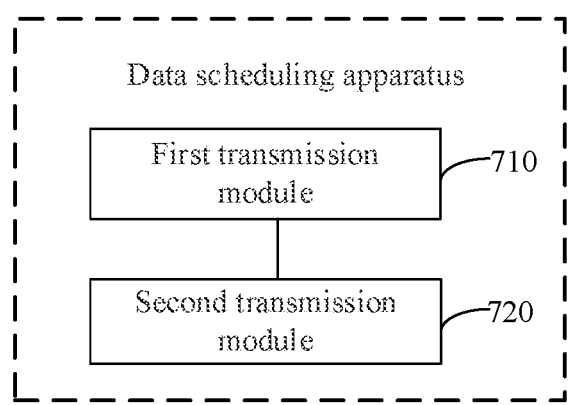
FIG. 14 is a block diagram of another data scheduling apparatus according to some embodiments.

Optionally, referring to FIG. 14, FIG. 14 is a block diagram of another data scheduling apparatus according to the embodiment shown in FIG. 12. The apparatus further includes:

a second transmission module 720 configured to transmit to the terminal a target transmission mode corresponding to each of the plurality of target time domain units, the target transmission mode being a transmission mode for performing data bearing on the plurality of target time domain units according to the scheduling signaling.

Figure 15:
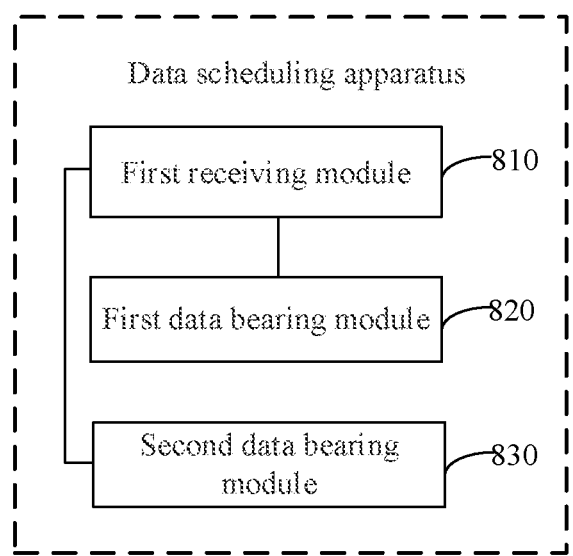
FIG. 15 is a block diagram of another data scheduling apparatus according to some embodiments.

Referring to FIG. 15, FIG. 15 is a block diagram of a data scheduling apparatus applied to a terminal according to some embodiments. The apparatus includes:

a first receiving module 810 configured to receive a rule transmitted by a base station for determining target location information corresponding to each of a plurality of target time domain units;

a first data bearing module 820 configured to, when receiving uplink scheduling signaling transmitted by the base station, transmit uplink data to the base station on the plurality of target time domain units indicated by the rule of the target location information; and a second data bearing module 830 configured to, when receiving downlink scheduling signaling transmitted by the base station, receive downlink data transmitted by the base station to the terminal on the plurality of target time domain units indicated by the rule of the target location information.

Optionally, when the plurality of target time domain units is continuous in a time domain, the rule of the target location information at least includes: relative location information of a first target time domain unit of the plurality of target time domain units with respect to a reference time domain unit; and the rule of the target location information further includes:

a transmission length value of the plurality of target time domain units; or relative location information of the last target time domain unit of the plurality of target time domain units with respect to the reference time domain unit.

Optionally, the rule of the target location information includes:

relative location information of each of the plurality of target time domain units with respect to the reference time domain unit;

the reference time domain unit is a time domain unit where the scheduling signaling is located.

Figure 16:
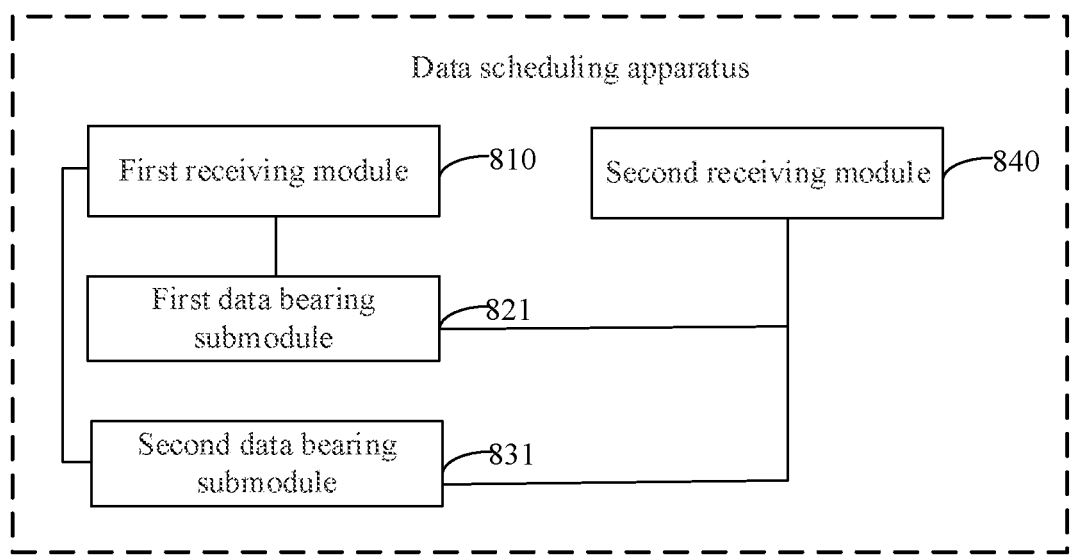
FIG. 16 is a block diagram of another data scheduling apparatus according to some embodiments.

Referring to FIG. 16, FIG. 16 is a block diagram of another data scheduling apparatus according to the embodiment shown in FIG. 15. The apparatus further includes:

a second receiving module 840 configured to receive a target transmission mode corresponding to each of the plurality of target time domain units transmitted by the base station;

The first data bearing module 820 includes:

a first data bearing submodule 821 configured to transmit uplink data to the base station using the target transmission mode corresponding to each of the plurality of target time domain units on the plurality of target time domain units indicated by the rule of the target location information; and the second data bearing module 830 includes:

a second data bearing submodule 831 configured to receive downlink data transmitted by the base station to the terminal using the target transmission mode corresponding to each of the plurality of target time domain units on the plurality of target domain units indicated by the rule of the target location information.

Figure 17:
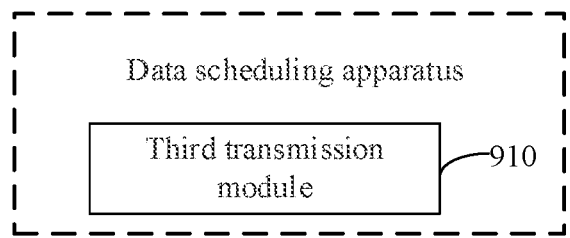
FIG. 17 is a block diagram of another data scheduling apparatus according to some embodiments.

Referring to FIG. 17, FIG. 17 is another block diagram of a data scheduling apparatus applied to a base station according to some embodiments. The apparatus includes:

a third transmission module 910 configured to transmit trigger signaling to the terminal, the trigger signaling being used to trigger data bearing on a plurality of target time domain units.

Optionally, the trigger signaling includes at least one of the following:

radio resource control signaling, system information, media access control address control unit, and physical layer signaling.

Figure 18:
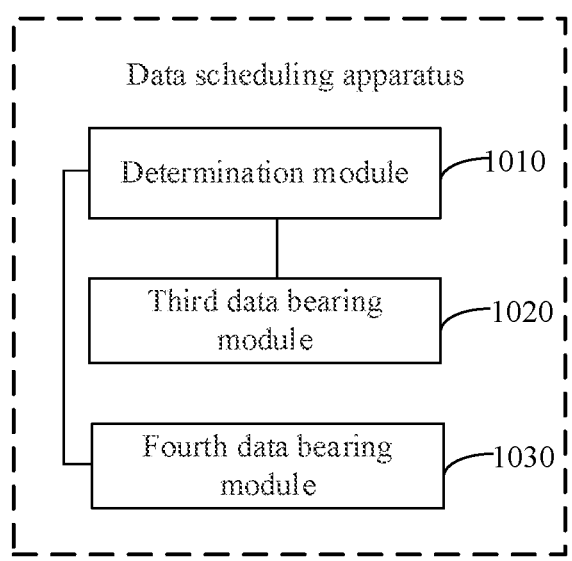
FIG. 18 is a block diagram of another data scheduling apparatus according to some embodiments.

Referring to FIG. 18, FIG. 18 is another block diagram of a data scheduling apparatus applied to a terminal according to some embodiments. The apparatus includes:

a determination module 1010 configured to, when trigger signaling transmitted by the base station is received, according to a predefined rule for determining a plurality of pieces of target location information and a location of scheduling signaling, determine a plurality of target time domain units indicated by the plurality of pieces of target location information;

a third data bearing module 1020 configured to, when the scheduling signaling is uplink scheduling signaling, transmit uplink data to the base station on the plurality of target time domain units; and a fourth data bearing module 1030 configured to, when the scheduling signaling is downlink scheduling signaling, receive downlink data transmitted by the base station to the terminal on the plurality of target time domain units.

Optionally, the trigger signaling includes at least one of the following:

radio resource control signaling, system information, media access control address control unit, and physical layer signaling.

Figure 19:
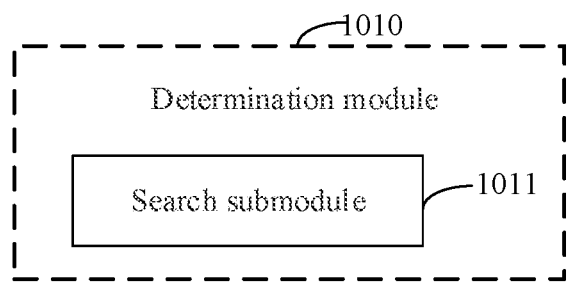
FIG. 19 is a block diagram of another data scheduling apparatus according to some embodiments.

Referring to FIG. 19, FIG. 19 is a block diagram of another data scheduling apparatus according to the embodiment shown in FIG. 18. The target location information is relative location information of the target time domain unit with respect to the scheduling signaling. The determination module 1010 includes:

a search submodule 1011 configured to search for the plurality of target time domain units indicated by the plurality of pieces of target location information according to relative location information of the plurality of target time domain units with respect to the scheduling signaling predefined in a communication protocol and the location of the scheduling signaling.

Figure 20:
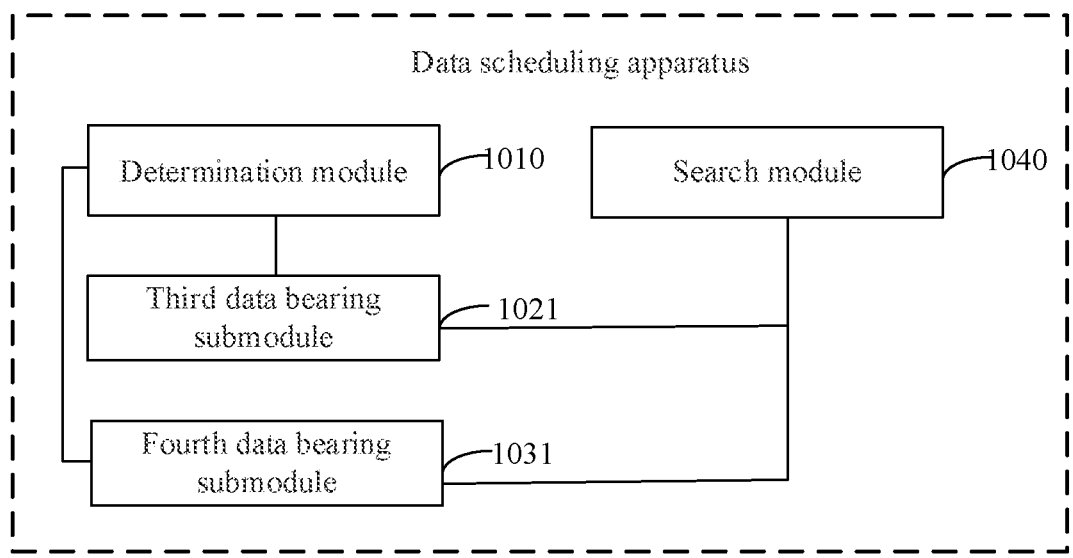
FIG. 20 is a block diagram of another data scheduling apparatus according to some embodiments.

Referring to FIG. 20, FIG. 20 is a block diagram of another data scheduling apparatus according to the embodiment shown in FIG. 18. The apparatus further includes:

a search module 1040 configured to search for a target transmission mode corresponding to each of the plurality of target time domain units for performing data bearing predefined in the communication protocol;

the third data bearing module 1020 includes:

a third data bearing submodule 1021 configured to transmit uplink data to the base station using the target transmission mode corresponding to each of the plurality of target time domain units on the plurality of target time domain units; and the fourth data bearing module 1030 includes:

a fourth data bearing submodule 1031 configured to receive downlink data transmitted by the base station to the terminal using the target transmission mode corresponding to each of the plurality of target time domain units on the plurality of target time domain unit data.

For the apparatus embodiment, since it basically corresponds to the method embodiment, it can be referred to the description of the method embodiment. The apparatus embodiments described above are merely illustrative. The units described as separate components may or may not be physically separated, and the components displayed as units may or may not be physical units, i.e. may be located in one place, or they can be distributed to a plurality of network elements. Some or all of the modules may be selected according to actual needs to achieve the objects off the present disclosure. Those of ordinary skill in the art can understand implement without any creative effort.

Accordingly, the present disclosure also provides a computer readable storage medium storing a computer program for performing the data scheduling method of the first aspect.

Accordingly, the present disclosure also provides a computer readable storage medium storing a computer program for performing the data scheduling method of the above second aspect.

Accordingly, the present disclosure also provides a computer readable storage medium storing a computer program for performing the data scheduling method of the above third aspect.

Accordingly, the present disclosure also provides a computer readable storage medium storing a computer program for performing the data scheduling method of the above fourth aspect.

Correspondingly, the present disclosure further provides a data scheduling apparatus applied to a base station, including:
a processor; and
a memory for storing processor executable instructions;
the processor is configured to:
transmit to a terminal a rule for determining target location information corresponding to each of a plurality of target time domain units, the plurality of target time domain units being a plurality of time domain units for performing data bearing according to scheduling signaling.

Correspondingly, the present disclosure further provides a data scheduling apparatus applied to a terminal, including:
a processor; and
a memory for storing processor executable instructions;
the processor is configured to:
receiving a rule transmitted by a base station for determining target location information corresponding to each of a plurality of target time domain units;
when receiving uplink scheduling signaling transmitted by the base station, transmit uplink data to the base station on the plurality of target time domain units indicated by the rule of the target location information; and
when receiving downlink scheduling signaling transmitted by the base station, receive downlink data transmitted by the base station to the terminal on the plurality of target time domain units indicated by the rule of the target location information.

Correspondingly, the present disclosure further provides a data scheduling apparatus applied to a base station, including:
a processor; and
a memory for storing processor executable instructions;
the processor is configured to:
transmit trigger signaling to a terminal, the trigger signaling being used to trigger data bearing on the plurality of target time domain units.

Correspondingly, the present disclosure further provides a data scheduling apparatus applied to a terminal, including:
a processor; and
a memory for storing processor-executable instructions;
the processor is configured to:
if trigger signaling transmitted by a base station is received, determine, according to a predefined rule for determining a plurality of pieces of target location information and a location of scheduling signaling, a plurality of target time domain units indicated by the plurality of pieces of target location information; and
when the scheduling signaling is uplink scheduling signaling, transmit uplink data to the base station on the plurality of target time domain units; and
when the scheduling signaling is downlink scheduling signaling, receive downlink data transmitted by the base station to the terminal on the plurality of target time domain units.

Figure 21:
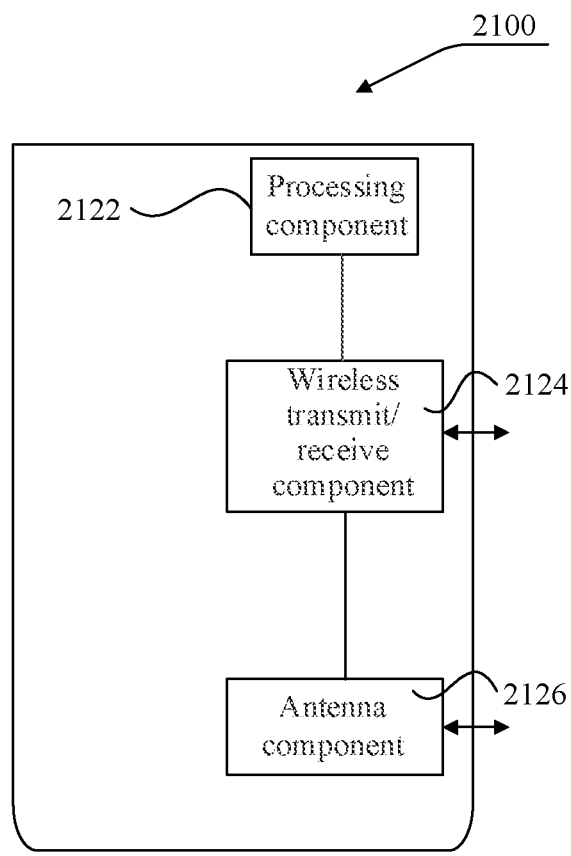
FIG. 21 is a schematic structural diagram of a data scheduling apparatus according to some embodiments of the present disclosure.

FIG. 21 is a schematic structural diagram of a data scheduling apparatus 2100 according to some embodiments. The apparatus 2100 can be provided as a base station. Referring to FIG. 21, the apparatus 2100 includes a processing component 2122, a wireless transmit/receive component 2124, an antenna component 2126, and a signal processing portion specific to the wireless interface. The processing component 2122 may further include one or more processors.

One of the processing components 2122 may be configured to perform the data scheduling method for the base station side as described above.

Figure 22:
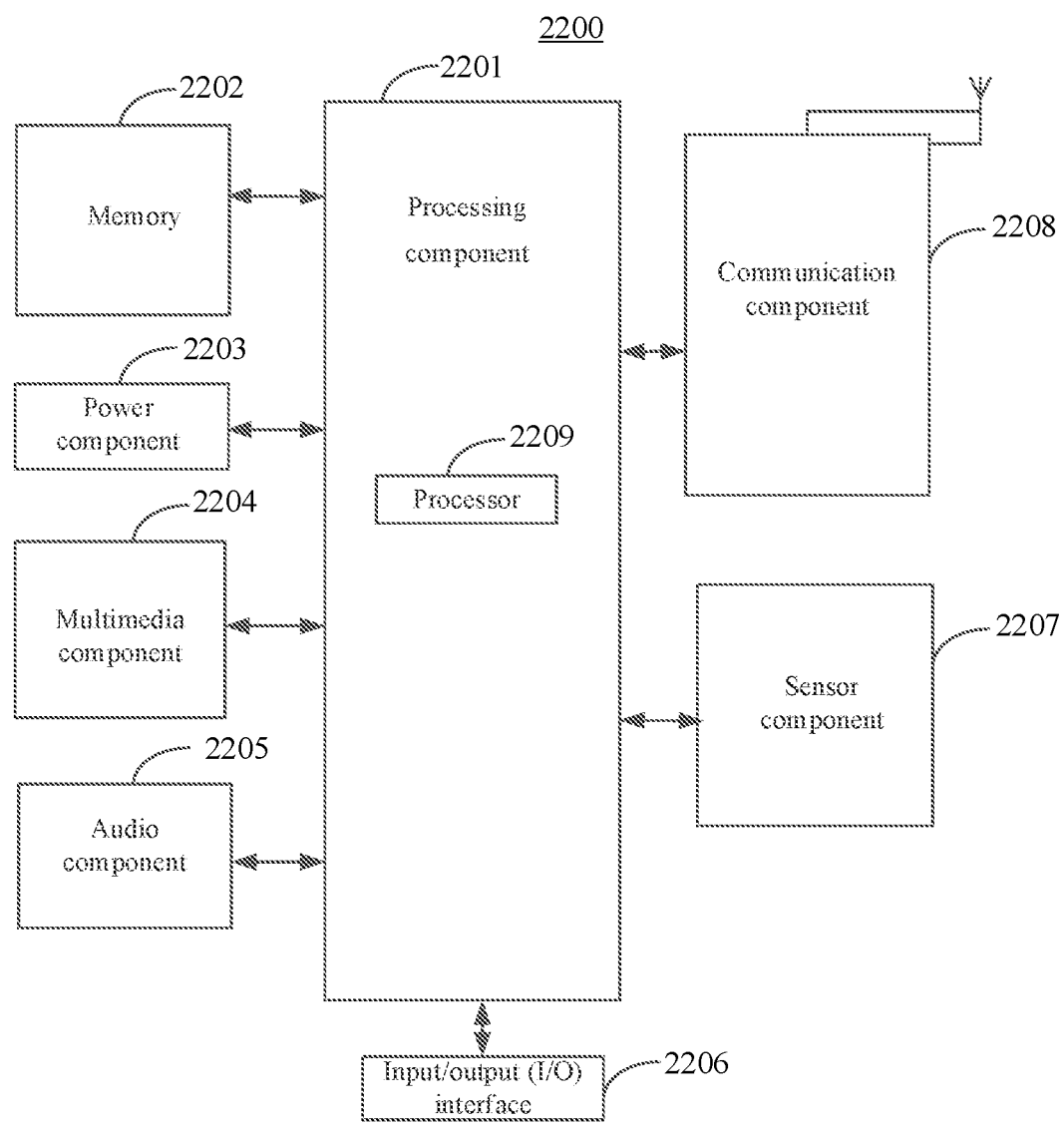
FIG. 22 is a schematic structural diagram of another apparatus for data scheduling apparatus according to some embodiments of the present disclosure.

FIG. 22 is a block diagram of an apparatus in accordance with an exemplary embodiment. As shown in FIG. 22, an apparatus 2200 is illustrated in accordance with an exemplary embodiment. The apparatus 2200 may be a mobile phone, a computer, a digital broadcast terminal, a messaging device, a gaming console, a tablet device, a medical device, a fitness equipment, a personal digital assistant, and the like.

Referring to FIG. 22, the apparatus 2200 may include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 typically controls the overall operations of the apparatus 2200, such as the operations associated with display, telephone calls, data communications, camera operations, and recording operations. The processing component 2201 may include one or more processors 2220 to execute instructions to perform all or part of the steps in the above described methods. Moreover, the processing component 2201 may include one or more modules which facilitate the interaction between the processing component 2201 and other components. For instance, the processing component 2201 may include a multimedia module to facilitate the interaction between the multimedia component 2204 and the processing component 2201.

The memory 2202 is configured to store various types of data to support the operation of the apparatus 2200. Examples of such data include instructions for any applications or methods operated on the apparatus 2200, contact data, phonebook data, messages, pictures, videos, etc. The memory 2202 may be implemented using any type of volatile or non-volatile memory devices, or a combination thereof, such as a static random access memory (SRAM) an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2203 provides power to various components of the apparatus 2200. The power component 2203 may include a power management system, one or more power sources, and any other components associated with the generation, management, and distribution of power in the apparatus 2200.

The multimedia component 2204 includes a screen providing an output interface between the apparatus 2200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 2204 includes a front camera and/or a rear camera. The front camera and the rear camera may receive external multimedia data while the apparatus 2200 is in an operation mode, such as a photographing mode or a video mode. Each of the front camera and the rear camera may be a fixed optical lens system or have focus and optical zoom capability.

The audio component 2205 is configured to output and/or input audio signals. For example, the audio component 2205 includes a microphone (MIC) configured to receive external audio signals when the apparatus 2200 is in an operation mode, such as a call mode, a recording mode, and a voice recognition mode. The received audio signal may be further stored in the memory 2202 or transmitted via the communication component 2208. In some embodiments, the audio component 2205 further includes a speaker for outputting audio signals.

The I/O interface 2206 provides an interface between the processing component 2201 and peripheral interface modules, such as a keyboard, a click wheel, buttons, and the like. The buttons may include, but are not limited to, a home button, a volume button, a start button, and a lock button.

The sensor component 2207 includes one or more sensors to provide status assessments of various aspects of the apparatus 2200. For instance, the sensor component 2207 may detect an on/off status of the apparatus 2200, relative positioning of components, e.g., the display device and the mini keyboard of the apparatus 2200, and the sensor component 2207 may also detect a location change of the apparatus 2200 or a component of the apparatus 2200, presence or absence of user contact with the apparatus 2200, orientation or acceleration/deceleration of the apparatus 2200, and temperature change of the apparatus 2200. The sensor component 2207 may include a proximity sensor configured to detect the presence of nearby objects without any physical contact. The sensor component 2207 may also include a light sensor, such as a CMOS or CCD image sensor, used for imaging applications. In some embodiments, the sensor component 2207 may also include an accelerometer sensor, a gyroscope sensor, a magnetic sensor, a pressure sensor, or a temperature sensor.

The communication component 2208 is configured to facilitate communication, wired or wirelessly, between the apparatus 2200 and other devices. The apparatus 2200 can access a wireless network based on a communication standard, such as Wi-Fi, 2G, or 3G, or a combination thereof. In an exemplary embodiment, the communication component 2208 receives broadcast signals or broadcast associated information from an external broadcast management system via a broadcast channel. In an exemplary embodiment, the communication component 2208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 2202 including instructions, executable by the processor 2209 in the apparatus 2200, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the apparatus 2200 is enabled to perform any of the above method in the terminal side.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data scheduling method comprising:
   transmitting, by a base station, a rule for determining location information corresponding to a plurality of time domain units to a terminal;
   wherein the plurality of time domain units are continuous in a time domain, and the plurality of time domain units perform data bearing according to scheduling signaling,
   the rule comprises at least one of:
   relative location information of a first time domain unit of the plurality of time domain units with respect to a reference time domain unit; or
   a transmission length value of the plurality of time domain units; or
   relative location information of a last time domain unit of the plurality of time domain units with respect to a reference time domain unit.

2. The method of claim 1, further comprising:
   sending, by the base station, uplink scheduling signaling to the terminal;
   receiving, by the base station, uplink data from the terminal on the plurality of time domain units.

3. A base station implementing the method of claim 2, comprising:
   a processor;
   a memory for storing processor executable instructions;
   wherein the processor is configured to perform operations of the method.

4. The method of claim 1, further comprising:
sending, by the base station, downlink scheduling signaling to the terminal;
sending, by the base station, downlink data to the terminal on the plurality of time domain units.

5. A base station implementing the method of claim 4, comprising:
a processor;
a memory for storing processor executable instructions;
the processor is configured to perform operations of the method.

6. The method of claim 1, further comprising:
transmitting, by the base station through radio resource control (RRC) signaling or scheduling signaling, the rule to the terminal.

7. A base station implementing the method of claim 6, comprising:
a processor;
a memory for storing processor executable instructions;
wherein the processor is configured to perform operations of the method.

8. A base station implementing the method of claim 1, comprising:
a processor;
a memory for storing processor executable instructions;
wherein the processor is configured to perform operations of the method.

9. A non-transitory computer-readable storage medium storing a computer program for execution by a processing circuit to perform the data scheduling method of claim 1.

10. The method of claim 1, wherein the rule further comprises:
relative location information of each of the plurality of time domain units with respect to the reference time domain unit.

11. A data scheduling method comprising:
receiving, by a terminal, a rule for determining location information corresponding to a plurality of time domain unit from a base station;
wherein the plurality of time domain units are continuous in a time domain, and the plurality of time domain units perform data bearing according to scheduling signaling,
the rule comprises at least one of:
relative location information of a first time domain unit of the plurality of time domain units with respect to a reference time domain unit; or
a transmission length value of the plurality of time domain units; or
relative location information of a last time domain unit of the plurality of time domain units with respect to a reference time domain unit.

12. The method of claim 11, further comprising:
receiving, by the terminal, uplink scheduling signaling from the base station;
transmitting, by the terminal, uplink data to the base station on the plurality of time domain units.

13. The method of claim 11, further comprising:
receiving, by the terminal, downlink scheduling signaling from the base station;
receiving, by the terminal, downlink data from the base station on the plurality of time domain units.

14. The method of claim 11, further comprising:
receiving, by the terminal through radio resource control (RRC) signaling or scheduling signaling, the rule from the base station.

15. A non-transitory computer-readable storage medium storing a computer program for execution by a processing circuit to perform the data scheduling method of claim 11.

16. The method of claim 11, wherein the rule further comprises:
relative location information of each of the plurality of time domain units with respect to the reference time domain unit.

17. A terminal, comprising:
a processor;
a memory for storing processor executable instructions;
the processor is configured to:
receive a rule for determining location information corresponding to a plurality of time domain unit from a base station;
wherein the plurality of time domain units are continuous in a time domain, and the plurality of time domain units perform data bearing according to scheduling signaling,
the rule comprises at least one of:
relative location information of a first time domain unit of the plurality of time domain units with respect to a reference time domain unit; or
a transmission length value of the plurality of time domain units; or
relative location information of a last time domain unit of the plurality of time domain units with respect to a reference time domain unit.

18. The terminal of claim 17, wherein the processor is further configured to:
receive uplink scheduling signaling from the base station;
send uplink data to the base station on the plurality of time domain units.

19. The terminal of claim 17, wherein the processor is further configured to:
receive downlink scheduling signaling from the base station;
receive downlink data from the base station on the plurality of time domain units.

20. The terminal of claim 17, wherein the processor is further configured to:
receive the rule from the base station through radio resource control (RRC) signaling or scheduling signaling.

* * * * *